Nov. 22, 1938.    R. B. P. CRAWFORD    2,137,996
AIR CONDITIONING SYSTEM
Original Filed July 5, 1929    11 Sheets-Sheet 8

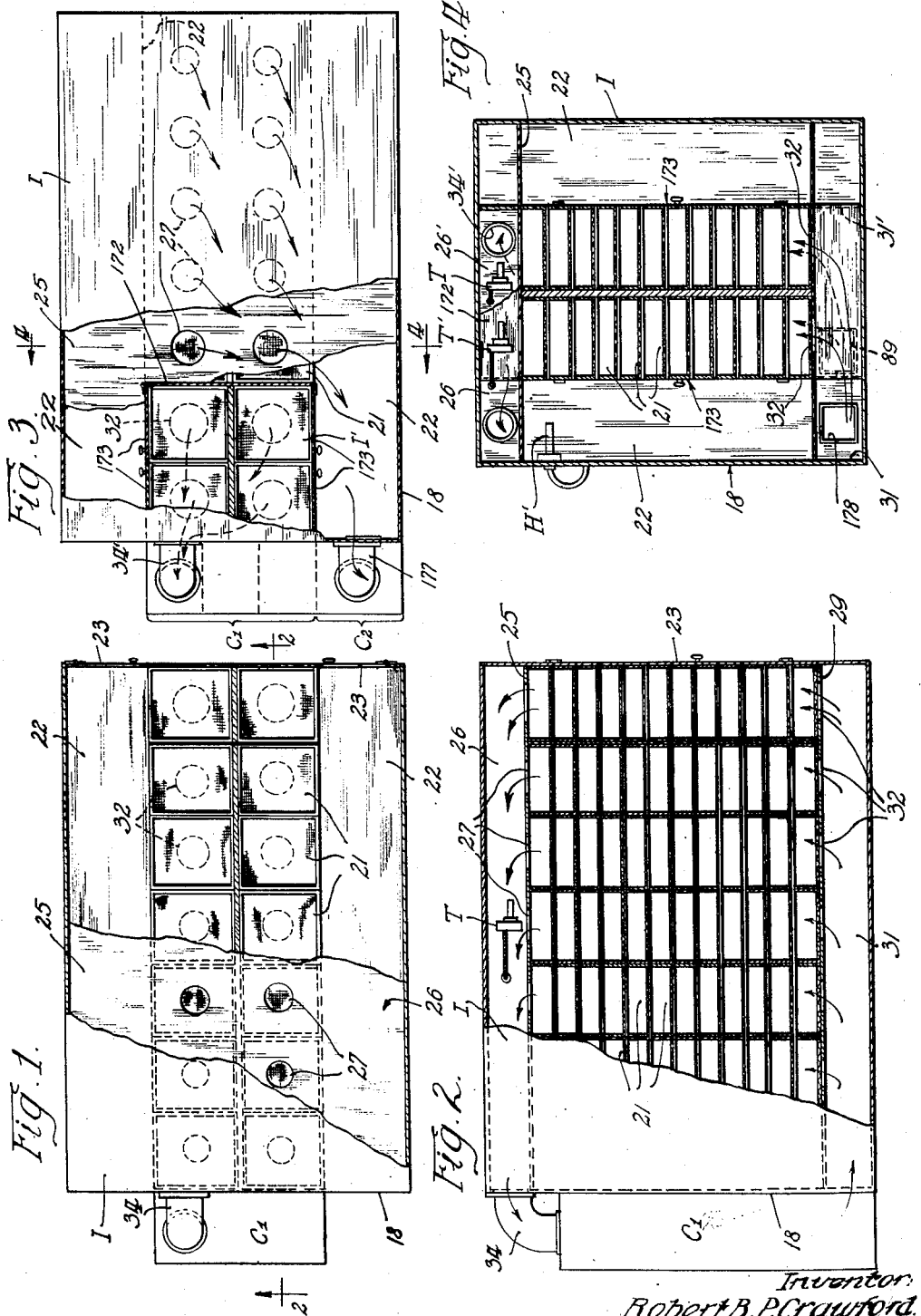

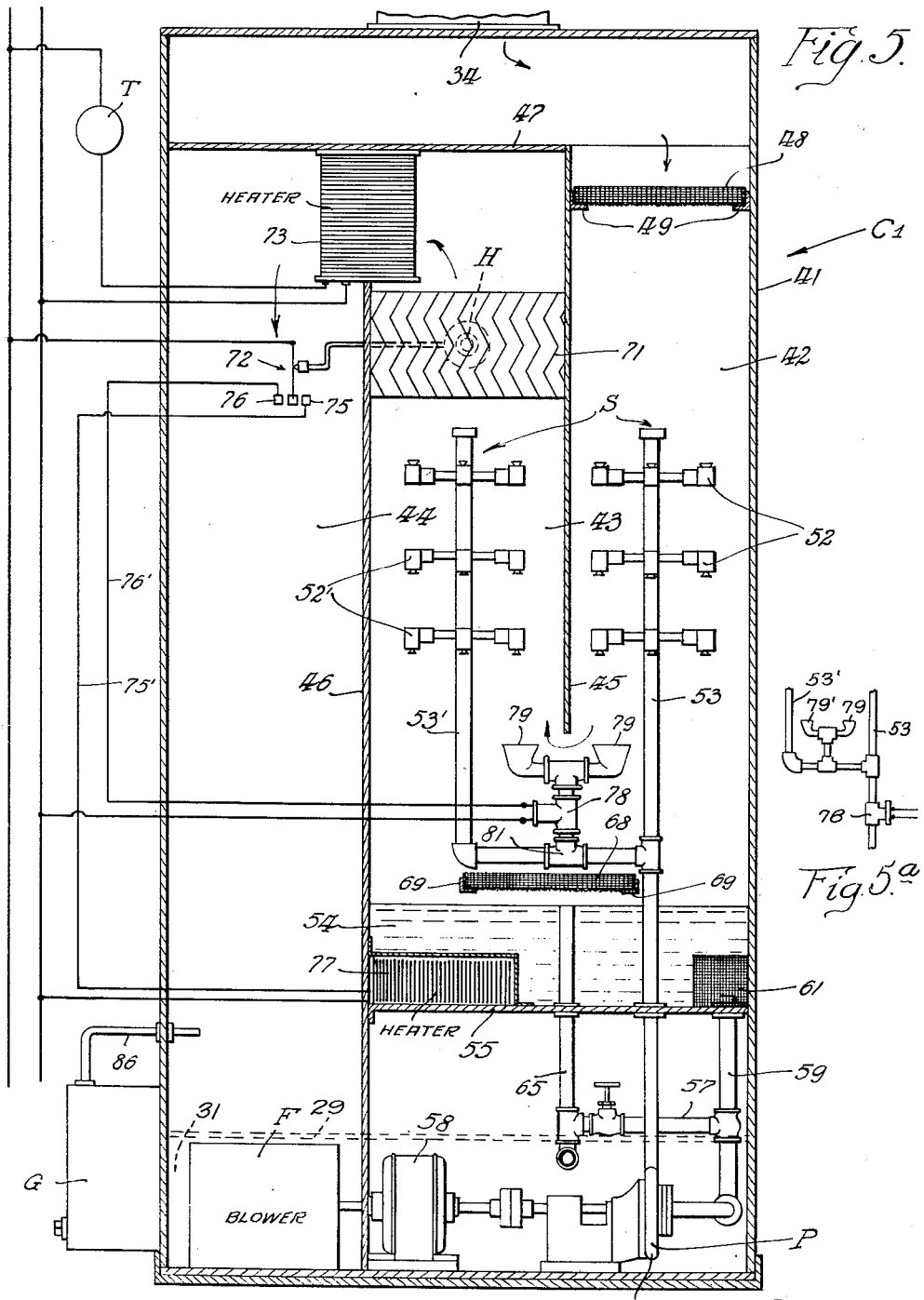

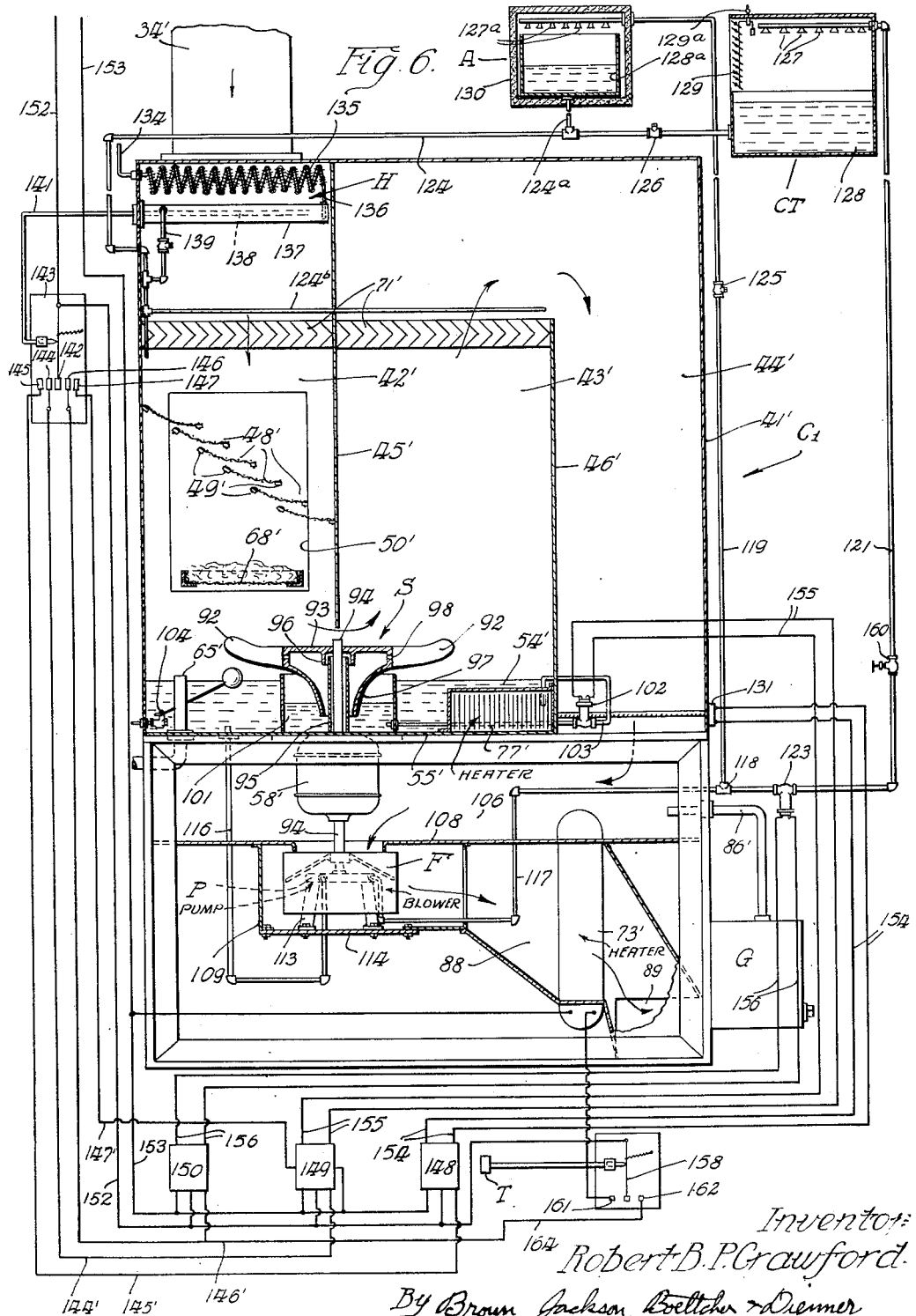

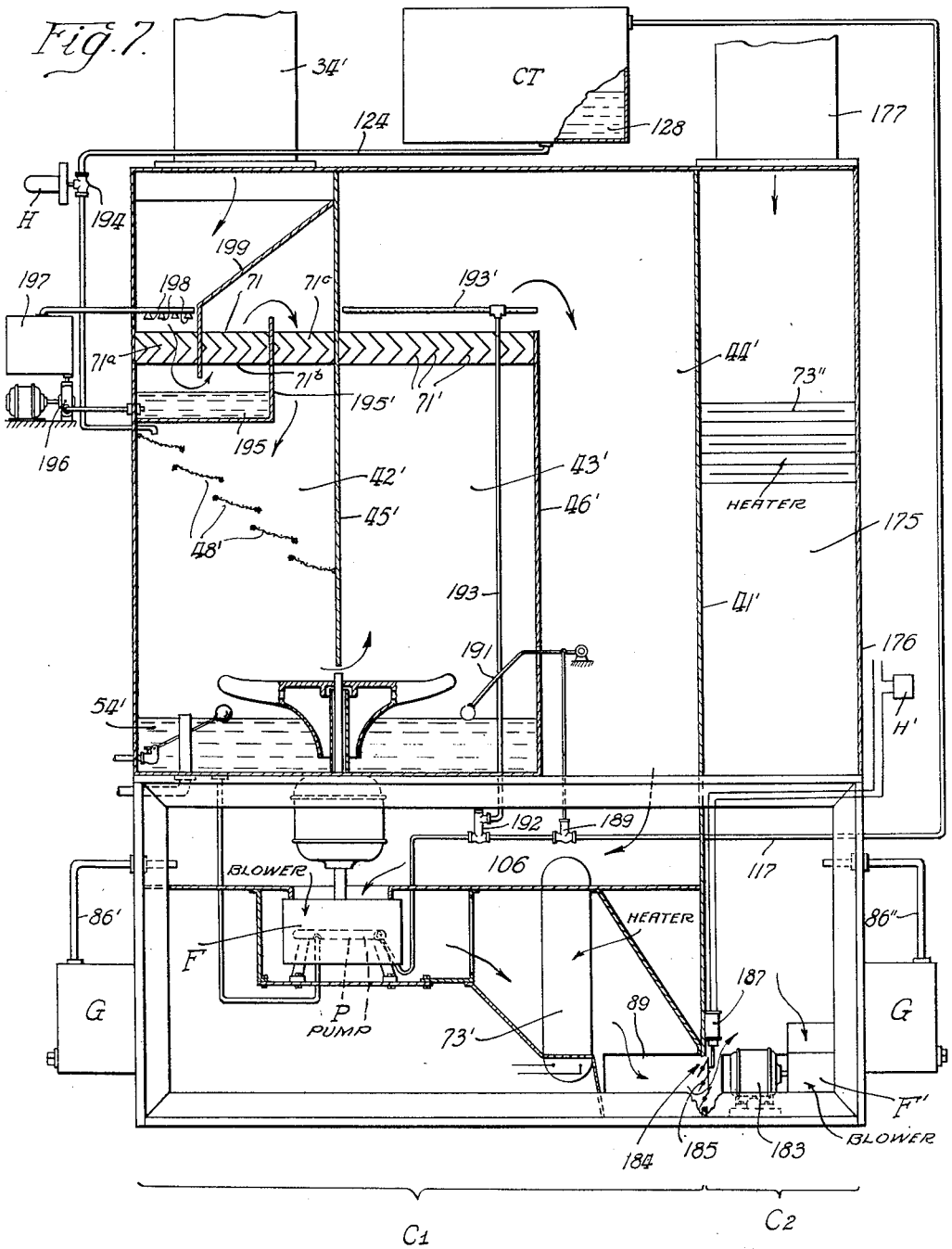

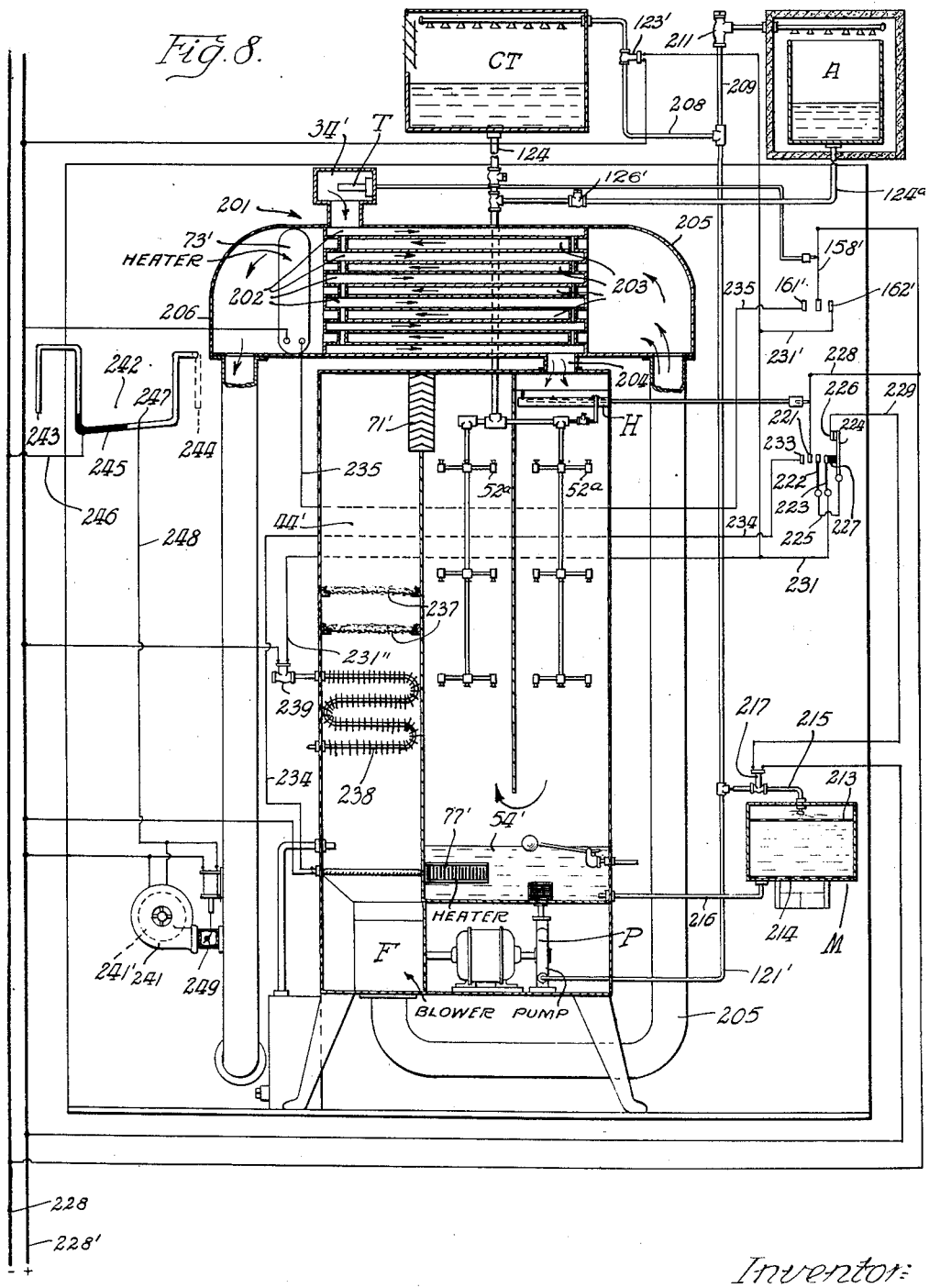

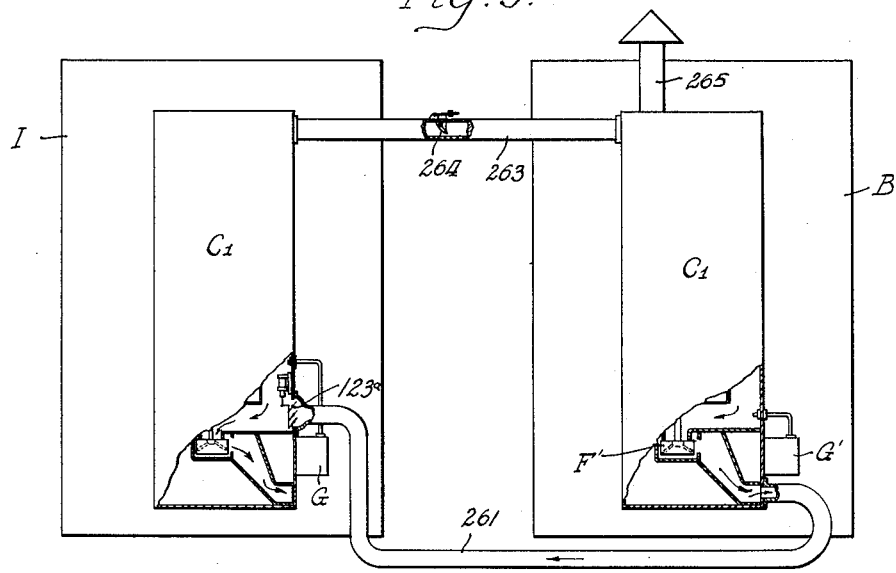
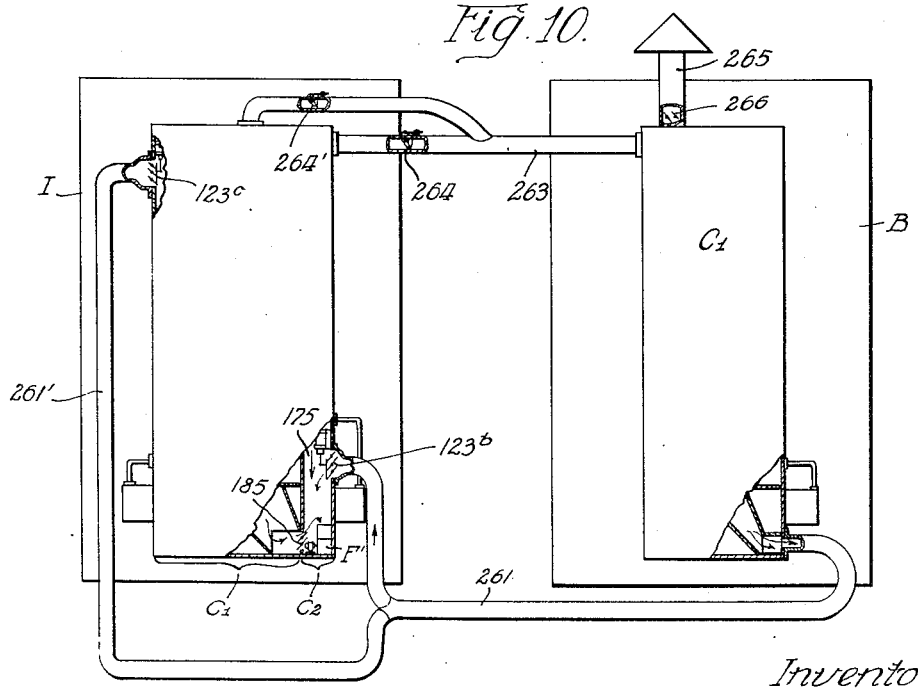

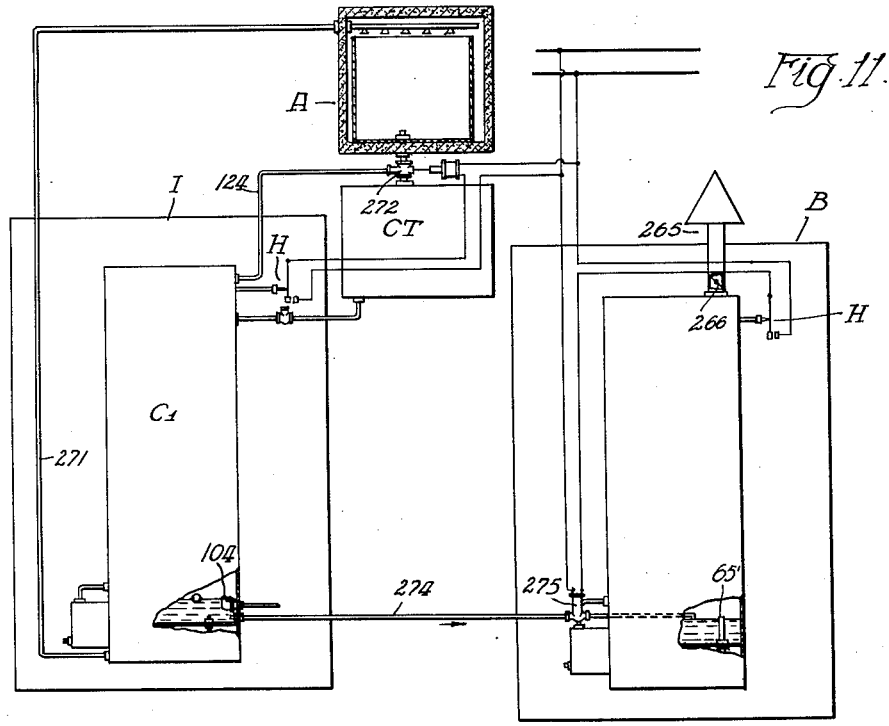
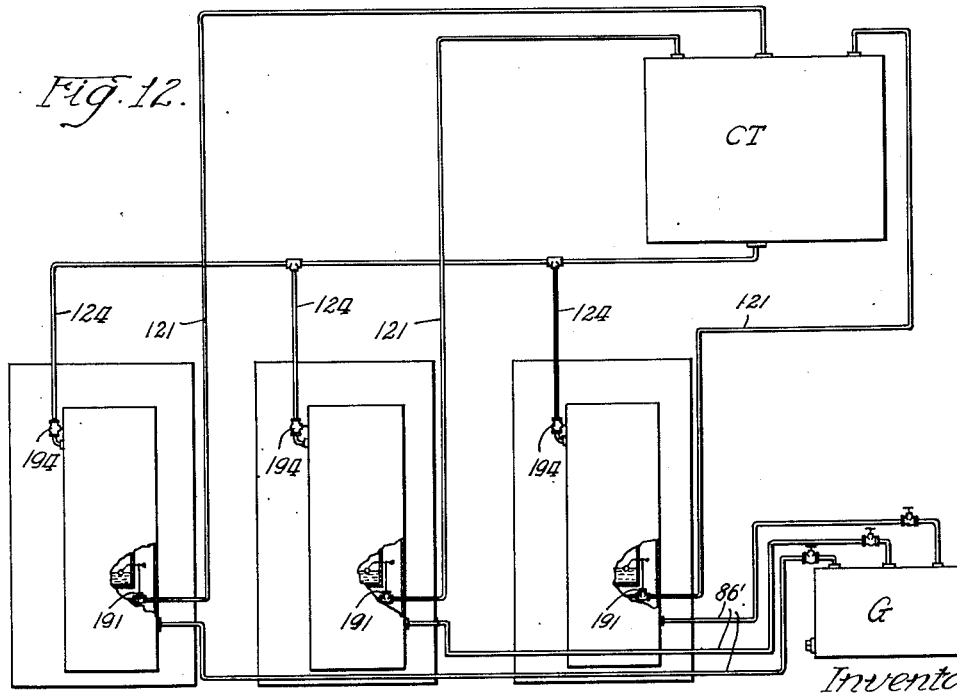

Inventor:
Robert B. P. Crawford
By Brown, Jackson, Boettcher & Dienner
Attys

Nov. 22, 1938.    R. B. P. CRAWFORD    2,137,996
AIR CONDITIONING SYSTEM
Original Filed July 5, 1929    11 Sheets-Sheet 9

Inventor:
Robert B.P. Crawford.
By Brown, Jackson, Boettcher & Diener
Attys.

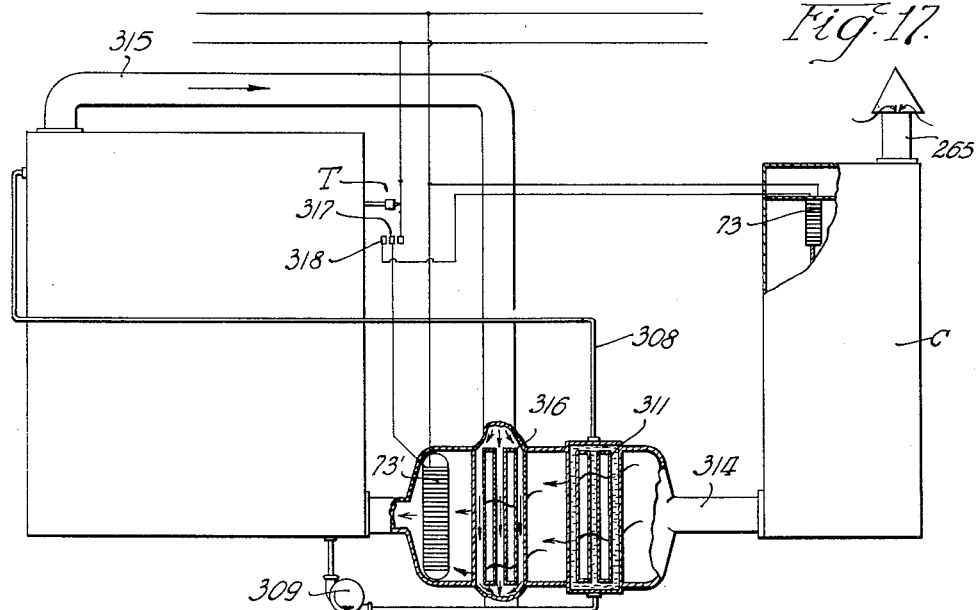
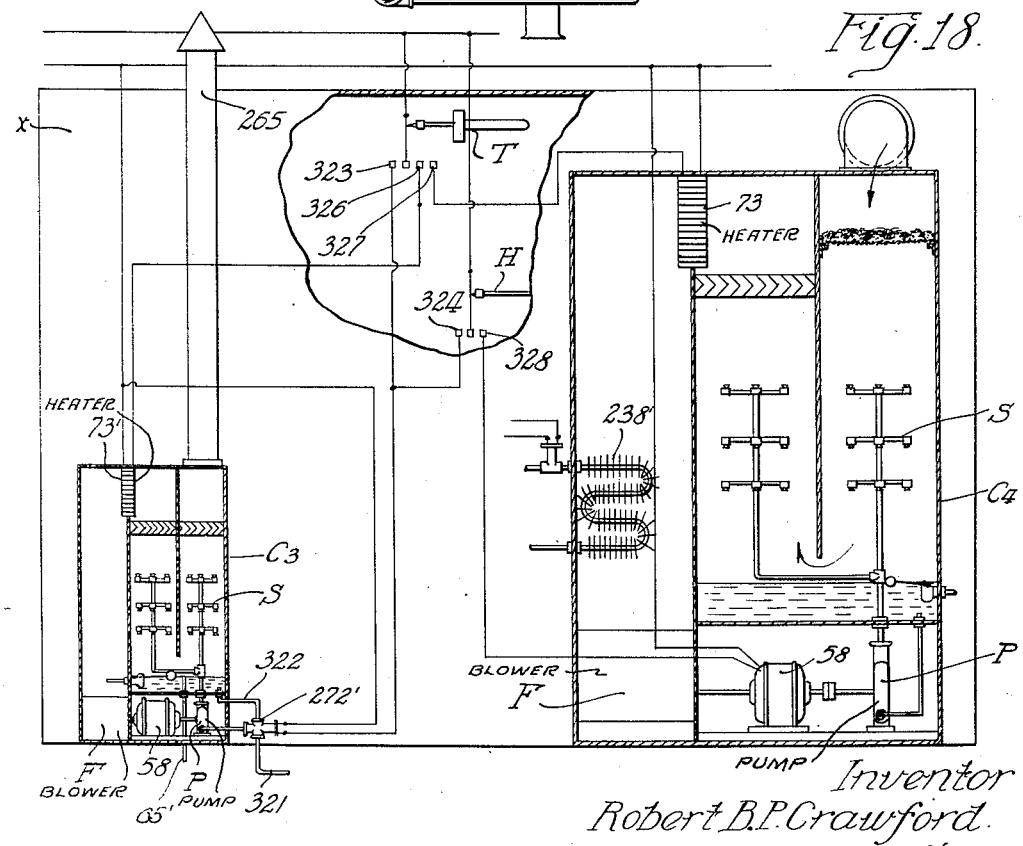

Nov. 22, 1938.    R. B. P. CRAWFORD    2,137,996
AIR CONDITIONING SYSTEM
Original Filed July 5, 1929    11 Sheets-Sheet 11
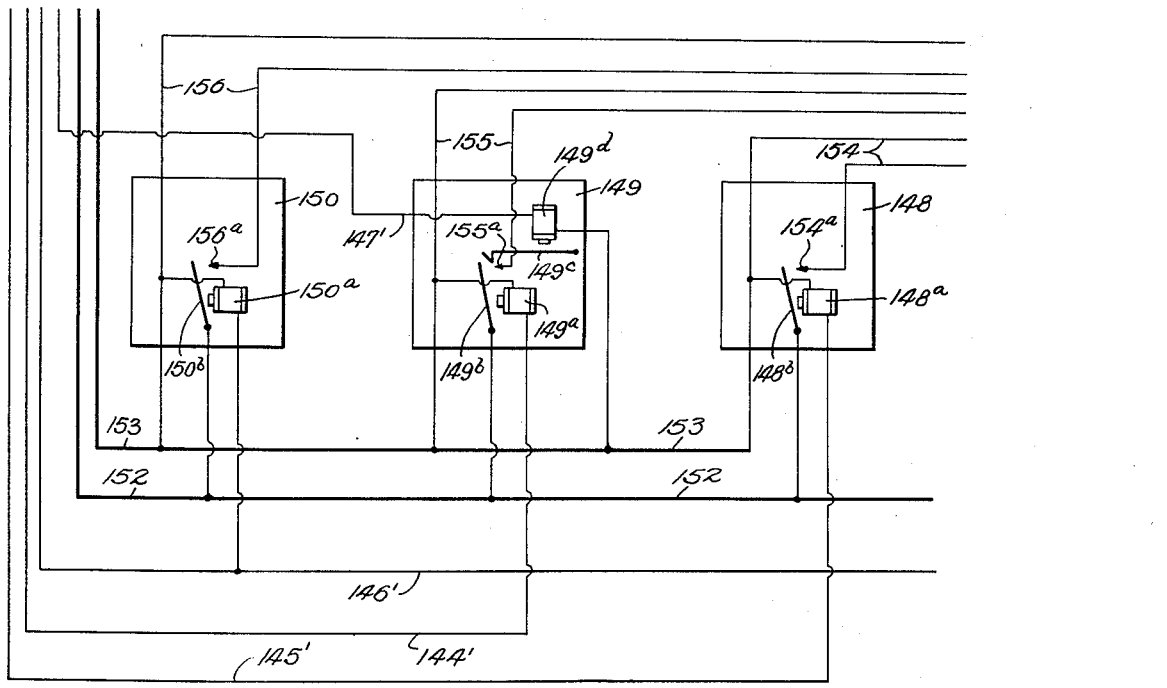
Fig. 6ª
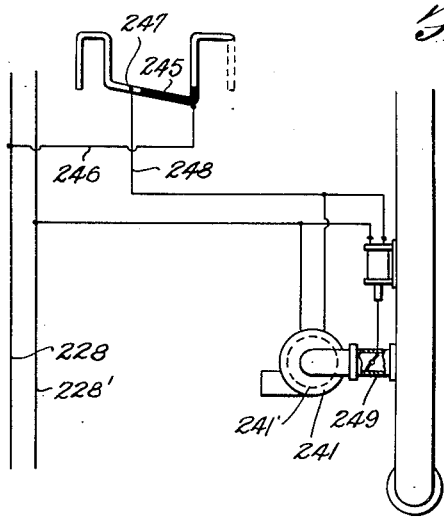
Fig. 8ᵇ.
Fig. 8ª
Inventor
ROBERT B. P. CRAWFORD,
By AYates Dowell
Attorney Patented Nov. 22, 1938

2,137,996

UNITED STATES PATENT OFFICE 2,137,996

AIR CONDITIONING SYSTEM

Robert B. P. Crawford, Washington, D. C., assignor to Frick Company, Waynesboro, Pa., a corporation of Pennsylvania Application July 5, 1929, Serial No. 375,952
Renewed June 10, 1938

45 Claims. (Cl. 257—1)

This invention relates to air conditioning systems and more particularly to the method of and apparatus for maintaining the required humidity and temperature conditions in such systems along with special treatments applied particularly to recirculated air as will be disclosed hereinafter in detail.

The present invention is shown as used in connection with incubating and brooding apparatus such as is used on poultry farms for hatching eggs and brooding chicks, and has as its general object to provide improved methods and apparatus for governing the conditions under which the incubating and brooding operations occur, to the end of increasing the yield of healthy chicks from a given quantity of fertile eggs. The steps of incubating and hatching are so closely related, the one immediately following the other in the period of incubation of the egg, that, insofar as certain broad features of the invention are concerned, they may be regarded as the same, and the same is also true of the steps of hatching and brooding, while with reference to other more specific features of the invention the operations of incubating, hatching and brooding are three entirely distinctive steps calling for different apparatus and a different treatment of conditions in association with each, as will be pointed out at greater length in the detail description of my invention.

Owing to the large scale operations under which incubating and brooding is now carried on, wherein thousands of eggs are frequently handled in a single hatch, it is now being realized that for the greatest hatching yield consideration must be given to factors which were hitherto not appreciated or were totally ignored. In order that the highest efficiency may be obtained in the incubating, hatching and brooding enclosures, I have found that consideration must be given to the following conditioning factors: (1) The maintenance of the proper temperature; (2) the maintenance of the proper humidity; (3) the supplying of the requisite oxygen; (4) the dissipation or removal of carbon dioxid and other gases emitted from the eggs; (5) the supplying of a bactericidal agent, such being highly desirable, although not essential; and (6) the removal of fluff picked up by the air currents from the bodies of the chicks, such also being highly desirable, although not essential.

Eggs in their early stages of incubation require the supplying of an appreciable amount of heat thereto, and, hence, the air contacting with these eggs must be at a sufficiently high temperature to supply this heat. On the other hand, eggs in the advanced stage of incubation generate and emit heat, and care must be taken that the air contacting with these eggs does not allow them to become overheated. It will therefore be seen that the maintenance of the proper temperature is critical, where maximum incubating efficiency is desired, and the circulation of this air is also important for the avoidance of "hot spots" in the incubating enclosure.

Still further, the temperature of the air supplied to the hatched chicks should preferably be considerably lower than the temperature of the air circulated through the eggs.

With reference to humidity, it is desirable that such be maintained at an approximately constant percentage, or within certain limits. Moreover, the relative humidity of the air in the incubating egg enclosure should preferably be of a different value than the relative humidity of the air in the chick enclosure.

Eggs in the advanced stage of incubation give off considerable carbon dioxid, and these eggs must be supplied with additional oxygen. The carbon dioxid emitted from these eggs in the advanced stage of incubation, and from the chicks, must be effectively removed from the air for maximum incubating and brooding efficiency. The use of a bactericidal agent is a preferred step in my improved method for preventing the growth of bacteria. According to one method the invention contemplates the use of ozone or formaldehyde as the bactericidal agent, and preferably supplies such agent to the different enclosures in different proportions, represented by an inhibiting or weak concentration in one case, and by a killing or strong concentration in another case. According to an alternative or supplementary method, the circulating air is brought into contact with a purifying circulation of liquid in the conditioning apparatus.

Based upon the foregoing, the invention has as one of its principal objects to provide an improved method of and apparatus for conditioning the incubating, hatching and brooding enclosures whereby all of the above conditioning factors are properly taken care of and are properly regulated in accordance with the particular requirements of the enclosure.

A further object of the invention is to provide incubating and hatching apparatus which can be substantially closed to atmosphere and wherein substantially the same charge of air is recirculated continuously through the apparatus. In this continuously repeated cycle of circulation such volume of air is repeatedly reconditioned as to humidity, temperature, the removal of carbon dioxid, the removal of fluff, the replenishment of oxygen, and the supplying of a bactericidal agent. By virtue of the fact that the air circuit can be substantially closed to atmosphere, the above conditioning factors can more easily be maintained at fixed definite values, such being of particular importance as regards temperature and humidity, which are thus substantially isolated from the influence of temperature and humidity variations of outside atmosphere. Such substantial isolation of the volume of conditioning air from outside influences enables the temperature and humidity of the conditioning air to be maintained at the desired values with a minimum expenditure of energy. In its continuously repeated circulation in the system, this volume of conditioning air functions as a vehicle or conveying medium for conveying the proper temperature to or from the eggs and chicks; for conveying the proper humidity to the eggs and chicks; for conveying the carbon dioxide from the eggs and chicks to a point of dissipation from the system; for conveying oxygen and a bactericidal agent to the eggs and chicks; and for conveying fluff from the chicks to a point of fluff removal.

As above remarked, numerous advantages accrue to the ability to substantially seal or close the air circuit from the atmosphere, avoiding those temperature and humidity losses and fluctuations which are always incident to the use of fresh air inlets and foul air vents, and in most embodiments of the present invention the air circuit is thus closed from the atmosphere. However, the invention is not limited to this specific arrangement, and in fact I have shown some embodiments where the air circuit or the enclosure has communication with the atmosphere, such being particularly adaptable, for example, to brooders wherein the conditioning requirements as to temperature and humidity are not so exacting as in incubating and hatching enclosures.

A further object of the invention is to provide an improved method of reducing the temperature of the spray water for the conditioning apparatus, comprising the novel step of utilizing an outside cooling tower and thus avoiding the expense and care of operation of refrigerating apparatus or the supplying of cooler city water. In this regard, another object of the invention is to provide an improved method of dissipating carbon dioxid and other objectionable gases to the atmosphere while still retaining the circuit of the conditioning air substantially closed to atmosphere.

A further object is to provide an improved conditioning system wherein the installation cost and the operating expenses are kept low by a unique method of heat interchange and humidity interchange between the different enclosures of the system. A further object is to provide a conditioning system of the above general description wherein practically all of the controlling and regulating operations are performed automatically.

Other objects and advantages of the invention will appear in the following description, disclosing one preferred manner of carrying my invention into effect. In the drawings accompanying this description:—

Fig. 1 is a plan view of an incubating and hatching enclosure to which my invention has been applied, with the upper portion partly broken away;

Fig. 2 is a side view thereof, partly in longitudinal section on the plane of the line 2—2 of Fig. 1;

Fig. 3 is a view similar to Fig. 1, of an enclosure wherein the air supplied to the hatching eggs is handled separately from the air supplied to the incubating eggs;

Fig. 4 is a transverse sectional view through this latter embodiment, taken approximately on the plane of the line 4—4 of Fig. 3;

Fig. 5 is a vertical sectional view through a relatively simple form of conditioning apparatus arranged for handling a single volume or quantity of air;

Fig. 5A is a detail figure showing a modified construction of the conditioning apparatus illustrated in Fig. 5;

Fig. 6 is a similar sectional view through another embodiment of conditioning apparatus for handling a single volume or quantity of air, the electrical control circuits thereof being illustrated diagrammatically;

Fig. 6A is a fragmentary diagram of the circuits of the control relays illustrated in Fig. 6;

Fig. 7 is another vertical sectional view through a modified embodiment of conditioning apparatus handling two separate volumes or quantities of air, and illustrating the humidity controlling or transferring communication between the two portions of the system;

Fig. 8 is a vertical sectional view through another modified embodiment of conditioning apparatus, the control apparatus therefor being illustrated diagrammatically;

Fig. 8A is a vertical sectional detail view of refrigerating apparatus for cooling the spray water and also a control valve for introducing cold water to the circulating system;

Fig. 8B is a fragmentary diagram of a modified arrangement of the pressure controlled blower means illustrated in Fig. 8;

Figs. 9, 10, 11, 12, 13 and 14 are diagrammatic views illustrating adaptations of my invention to a plurality of enclosure units;

Figs. 16 and 17 are similar views showing modified arrangements thereof; and

Fig. 18 is an illustration, partly in section, of an embodiment employing two conditioning devices, and adaptable to the conditioning of different types of enclosures calling for different conditioning requirements.

Figure 13:
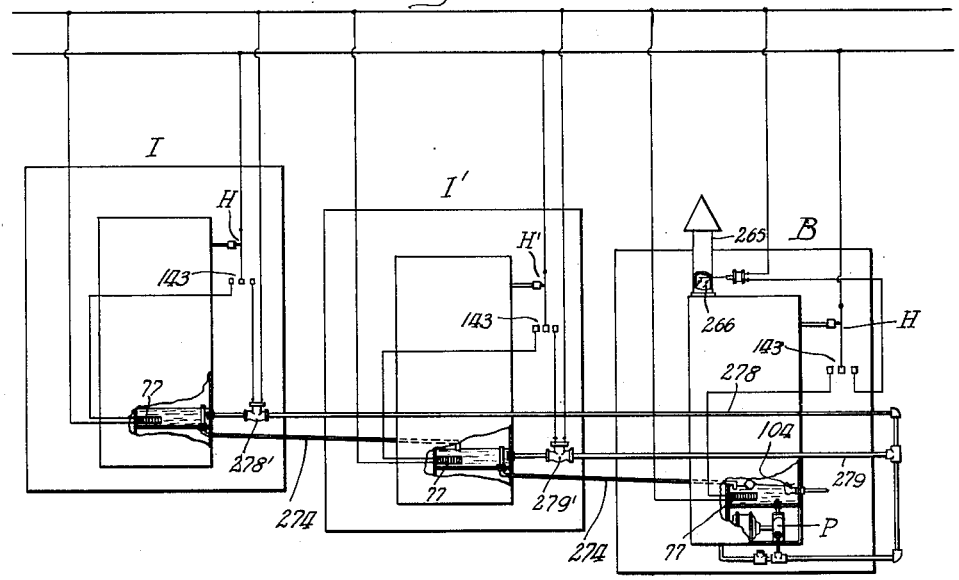

Referring first to Figs. 1 and 2, an incubating enclosure is generally indicated at I. The eggs undergoing incubation are supported in stacks of superposed trays 21 which may be grouped in any preferred relation in the incubator.

In the arrangement shown, the trays are grouped in a tier or tiers extending centrally of the enclosure, whereby an aisle 22 is provided at each side of the stack or tier, from which aisles access may conveniently be had to the trays from opposite sides of the stack. Entrance doors 23 are provided for the aisles 22 at one end of the enclosure. The egg supporting trays are usually mounted on tiltable supporting means whereby the trays may be tilted periodically to turn the eggs, the details of such tilting mechanism in and of themselves forming no part of the present invention. A false ceiling 25 spaced from the roof of the enclosure defines an upper plenum chamber 26 into which the ascending air enters through openings 27 in the false ceiling 25. A floor 29 spaced from the bottom of the enclosure defines a lower plenum chamber 31 into which the conditioned air is circulated for passing up through openings 32 in the floor 29 and circulating upwardly between the eggs. It will be understood that the bottom of the trays 21 are of openwork or mesh construction so that the ascending current of air will have intimate contact with all of the eggs.

During incubation the eggs are periodically moved as stated above and when the eggs are being tilted it is convenient and desirable to progressively move the trays from one position to another in the tiers, from one tier to another, as when the eggs reach the hatching period, or otherwise. When the eggs reach the hatching stage, the trays containing the same may be shifted to another portion of the tier or to any other part of the enclosure, or such trays may be allowed to remain in the positions to which they have been progressively moved during the incubating period.

In the disclosure illustrated in Figs. 1 and 2 the same volume or quantity of air which is circulated in contact with the eggs in process of incubation is also circulated in contact with the eggs which have reached the hatching stage. The air ascending into the upper plenum chamber 26 is circulated longitudinally thereof into a duct 34 leading to the upper end of a conditioning unit C1 disposed at the end of the incubating enclosure I.

Referring to Fig. 5, such conditioning unit comprises a casing 41 having its interior divided into three vertical passageways 42, 43 and 44 by the two vertical partitions 45 and 46. A transverse partition 47 closes the upper ends of the two passageways 43 and 44. The air entering through the duct 34 passes downwardly through the chamber area or passageway 42, first encountering a fluff removing screen 48 extending across the upper end of the passageway 42. The mesh of this screen is sufficiently fine to catch all of the light feathery fluff picked up by the air rising through the hatching trays. The screen has tray flanges around its perimeter which slide upon angle iron supporting brackets 49, the front or side wall of the casing having a normally closed opening through which the screen can be withdrawn for cleaning.

The air then passes through a spray zone created by spray apparatus S comprising nozzles 52 projecting outwardly from a vertical spray pipe 53. The upper nozzles discharge upwardly against the screen 48 and the lower nozzles discharge downwardly, although such arrangement is not essential.

The air then passes around the lower end of the partition 45 and upwardly into the intermediate passageway 43, where it enters another spray zone created by the discharge from nozzles 52' projecting from a branch spray pipe 53'. Some of the latter nozzles are preferably directed upwardly so that part of the spray is upwardly and part downwardly. The precipitated spray water accumulates in a reservoir or tank 54 formed at the lower ends of the passageways 42 and 43 by a transverse plate 55 extending between the side wall of the casing and the partition 46. The main spray pipe 53 extends down through the water tank 54 and connects with the outlet of a pump P disposed below the water tank. The pump is driven by an electric motor 58, also disposed in this lower pump compartment of the casing. A return pipe 59 leads downwardly from the bottom of the tank 54 and communicates with the inlet to the pump P, the upper end of such return pipe being preferably closed over by a straining screen 61 to prevent foreign matter being circulated by the pump. Such water as is taken up by the air in the humidification of the latter is replenished from an outside source of supply connecting with the pump or with the tank 54 through a suitable float controlled valve in any well known manner. The possibility of an excessively high level in the tank 54 is prevented by an overflow pipe 65 leading to an outside point of discharge.

Disposed above the water chamber 54 is a basket or tray 68 adapted to contain lime or other alkali for absorbing carbon dioxid from the air. Such lime container is also removably supported on angle brackets 69, and the front wall of the casing is provided with a normally closed opening through which such container can be withdrawn for replenishing the lime supply.

The spray water in precipitating down over the lime in the container 68 carries some of this lime in solution up to the spray jets 52, 52' where it is projected into the air. The removal of substantially all carbon dioxid from the air occurs along with the humidification of the air in the two spray zones 42 and 43, by virtue of the higher partial pressure of the carbon dioxid resulting in absorption thereof by the spray water, and also by virtue of the direct contact of the air with the lime in the container 68, as will be hereinafter described in more detail.

Extending across the upper portion of the intermediate passageway 43 is a series of baffles 71 which prevent the spray from passing upwardly out of the upper end of said passageway, and which also function to scrub the air and remove excess, unvaporized water therefrom. Projecting into such baffles is a thermostat H, of any desired type, which governs the humidity of the air, as will be presently described. After passing up through the baffles 71 the air is deflected laterally and passes through an electric heater 73, from whence it enters the upper end of the third passageway 44. This heater is controlled by a thermostat preferably located in the incubating enclosure, such being hereinafter described in the description of the control circuits. The air circulating down through the passageway 44 enters a blower F which impels it through a suitable duct into the lower plenum chamber 31 below the floor in the incubating enclosure.

The rotor of the fan or blower F is coupled to the electric motor 58 through the partition wall 46 whereby the same motor drives the spray pump and the blower.

The humidity regulating device or apparatus H senses the dew point or humidity of the air and may be arranged to effect its control on such dew point or humidity either by governing the temperature of the spray water, by governing the volume or character of the spray projected, by governing the admixing of chemicals with the spray liquid, and in various other ways to be hereinafter described. In the arrangement shown in Fig. 5, the humidity control is exercised over the temperature of the spray water and the volume or character of the spray projected. Such humidity regulating apparatus H comprises suitable control means as a part thereof, which control means may be mechanical, pneumatic or electrical in its operation. In the preferred electrical embodiment the rise and fall of dew point or humidity moves a switch 72 into engagement with either of two contacts 75 and 76. When the dew point falls below a predetermined value the switch establishes a circuit through contact 75 and wire 75' to an electric heater 77 disposed in the spray water tank 54. The consequent rise in temperature of the spray water functions to bring the dew point back up to its desired value. On the other hand, if the dew point or humidity should rise above a predetermined value the switch 72 establishes a circuit through contact 76 and wire 76' to an electromagnetically operated valve 78 which controls the discharge of spray from relatively coarse or large nozzles 79.

These nozzles have branch connection through a tee 81 or other suitable connection with the spray piping 53, 53', and when the valve 78 is opened the major portion of the water is discharged through these relatively large nozzles. Such discharge is a relatively coarse spray which is not vaporized or picked up by the air stream to the extent that the finer spray from the nozzles 52, 52' is. Hence, with a rise in humidity, the automatic opening of the valve 78 through the circuit connections above described, results in the projection of a coarse spray in lieu of the fine spray, thereby promptly lowering the humidity to its desired value. It will be understood that the automatic valve 78 might be arranged to interrupt the projection of all spray or a considerable part thereof in the spray chambers for lowering the humidity, but in such case the valve would be normally open and would close when energized by placing the valve 78 in pipe 53 above the pump and below the branch connections, as indicated in Figure 5A.

The dry bulb temperature of the air is controlled by temperature control means T comprising a thermostat and a suitable switch or other control device for regulating the electric air heater 73. The thermostat T is preferably located in the incubating enclosure I, although it may be situated in the duct leading from the upper portion of the enclosure to the conditioning unit, or in the duct leading from the conditioning unit to the lower portion of the enclosure but for convenience is diagrammatically illustrated outside the conditioner in Fig. 5, although it is shown in Fig. 2 in the incubator. Such thermostat functions with a lowering of the dry bulb temperature below its desired value to switch on or to increase the heating efficiency of the element 73, and to switch off or to decrease the heating action of such element with a rise of the dry bulb temperature, thereby maintaining the latter substantially constant.

The two thermostats H and T are adjusted to maintain a substantially fixed differential of predetermined value between the dew point and the dry bulb temperature of the air, thereby maintaining a substantially fixed relative humidity in the incubating enclosure. The permissible change of dry bulb temperature is confined between closely spaced limits, and, accordingly, if it is desired to adjust the relative humidity such is preferably accomplished by adjusting the response of the dew point thermostat H, or its control mechanism, whereby the relative humidity can be raised or lowered. In lieu of the electrical heating means 73 and 77, steam heating means may be employed under this same control of the two thermostats H and T, but such heating medium does not lend itself as readily to the critical control obtainable with electrical heating means, and, furthermore, steam heating means requires a continuous source of steam supply. The same is true of hot water heating means.

Comprising part of the conditioning apparatus 5 is an ozone generating machine indicated generally at G in Fig. 5. These devices are well known and need not be described in detail. The ozone is introduced into the conditioning unit through a conduit 86 leading from the ozone machine G and opening into the conditioning unit preferably in the passageway 44 above the blower F. Ozonized air is conducted from the conduit 86 into the conditioning unit at a rate proportioned to have the proper bactericidal and oxygen supplying characteristics suitable for incubating and hatching requirements. In lieu of ozone I may employ formaldehyde or some other bactericidal agent, which is preferably inserted into the system in the conditioning unit, so that the air stream will serve as a conveying and diffusing vehicle therefor.

By compelling such agent to pass through the fan F the same is effectively diffused in the air. The bactericidal agent may be introduced into the air stream through a membrane or porous material.

The operation of the above described embodiment is substantially as follows:—The motor 58 is operated continuously so that the fan or blower F maintains a continuous circulation of air through the enclosure I and through the conditioning unit. The continuously operating pump P also maintains a continuous spray discharge in the successive spray chambers 42 and 43. The conditioned air passing from the lower plenum chamber 31 up through the eggs heats the eggs in the early stages of incubation and maintains the eggs which are in the later stages of incubation at the proper uniform temperature. A high air velocity is maintained to avoid stagnant areas and the holes 32 in the plenum chamber walls may be of graduating diameters (Fig. 1) to obtain the most effective distribution of air. This air picks up carbon dioxid emitted from the eggs, and also picks up fluff from the chicks, and conveys the same through the upper plenum chamber 26 and through the duct 34 into the conditioning unit C1. The fluff is first removed from the air at the screen 48. Entering the spray zone in the region of the nozzles 52, the air becomes partially saturated, and also gives up a considerable part of its carbon dioxid to the spray water by reason of the difference of partial pressures of carbon dioxid between the air and water. Additional carbon dioxid is also absorbed by the lime in the container 68 as the air passes in contact with the same.

Passing upwardly through the other spray passageway 43, the saturation of the air is completed or augmented, and a further removal of all remaining carbon dioxid also occurs in this passageway, the same passing into solution in the water by reason of the difference of partial pressures and the lime content of the water.

It will be understood that the degree of water saturation of the air occurring in the two passageways 42 and 43 will be dependent upon the temperature of the spray water relatively to the temperature of the air and the superficial area of the water drops. The air passing upwardly through the baffles 71 will have removed therefrom all free water not constituting a part of the true vapor content of the air, and in passing through these baffles the dew point temperature will be sensed by the thermostat H. If the dew point is high for the predetermined dry bulb temperature or relative humidity, the automatic valve 78 will be opened for reducing the superficial area of the water drops, i. e., projecting a coarse spray, and, conversely, if the dew point is low the temperature of the spray water will be automatically raised by the energization of the electric water heater 77. The air in then passing through the heating element 73 will be heated or not, depending upon the temperature in the enclosure I, as sensed by the dry bulb thermostat T. At a point preferably between the heater 73 and the intake of the blower F, the ozone, formaldehyde or the like is introduced into the air stream from the source of supply G. It will hence be seen that the air returned by the blower F into the lower plenum chamber 31 has all fluff and carbon dioxid removed therefrom, contains a proportion of ozone for bactericidal and oxygen supplying purposes, is maintained at the desired relative humidity for most effective incubating and hatching, and is likewise maintained at the most effective dry bulb temperature for supplying heat to the eggs in the early stages of incubation and for maintaining uniform the desired temperature of all of the eggs in the advanced stages of incubation.

It is also noteworthy that the present system is substantially entirely enclosed or self-contained in that it always recirculates practically the same volume or charge of air, completely reconditioning the same in each cycle of its circulation, and, hence, avoiding the necessity of outlets for foul air, intakes for fresh air, etc., with the attendant objections of loss of heat, difficulty of maintaining the proper temperature, and difficulty of maintaining the proper humidity.

Fig. 6 illustrates a modified construction of conditioning unit C1 adapted for use with enclosures of the type illustrated in Figs. 1 and 2, wherein a single volume or quantity of air is continuously recirculated through a conditioning cycle. Such embodiment also comprises a main casing 41' having the upper portion of its interior divided into three passageways 42', 43' and 44' by the vertical partitions 45' and 46'. The air enters the upper end of the passageway 42' through the duct 34' leading from the upper plenum chamber of the incubating enclosure. In brief, the circulation of the air through the conditioning unit is somewhat similar to that described of the preceding embodiment, the air passing downwardly through the passageway 42' and upwardly through the passageway 43', in which passageways it is subjected to a water spray, and thence passing down through the third passageway 44' to a fan or blower F which impels the air through a lower passageway 88 to the duct 89 leading to the lower plenum chamber 31. In this modified embodiment the spray zone is created by a mechanically operating centrifugal water thrower S which draws water from the water chamber 54' and projects the same upwardly in a finely atomized condition in the two passageways 42' and 43' on opposite sides of the partition 45'. Said rotary spray device comprises a plurality of impelling arms 92 radiating from a hollow hub 93 which is secured to the upper end of a vertical motor shaft 94, the latter extending upwardly through the bottom wall 55' of the water tank from a vertical motor 58' disposed below the tank. A sleeve 95 extends upwardly from the bottom wall 55' to form a well for the shaft 94, such sleeve extending upwardly above the water level in the tank and having its upper end surrounded by an annular flange 96 within the hollow hub 93, such flange preventing the entrance of water into the upper end of the well sleeve 95. Extending downwardly and inwardly from the hub portion 93 is a conically formed skirt portion 97 having its lower end spaced from the stationary sleeve 95 to form an annular feeding passageway through which water is conveyed upwardly into the hollow interior of the hub. Small discharge orifices 98 are formed in the periphery of the hub, between the impelling arms 92, from which orifices the water is discharged in spray form. The arms 92 may be inclined slightly, like fan blades, for projecting the spray upwardly and outwardly to substantially fill both spray chambers 42' and 43' with a finely atomized spray. The water is sucked up into the hollow hub 93 from a feeding well 101, defined by an annular wall in the tank 54' surrounding the lower portion of the hollow hub. The quantity of water vapor projected into the chambers 42', 43' is governed by regulating the rate of water feed from the main water tank 54' to the feeding well 101, and if no spray is desired all supply to the well 101 is cut off.

This is effected by a regulating valve 102, which is interposed in a pipe 103 serving to conduct water from the main compartment 54' to the feeding well 101. This valve is automatically controlled in accordance with humidity requirements, as will be hereinafter described. A substantially constant level of water is maintained in the tank 54' by a float regulated inlet generally indicated at 104, and the possibility of the level rising above this predetermined height is prevented by an overflow outlet 65'.

The spray is prevented from being projected out of the two chamber areas 42' and 43' by baffles 71' extending across the upper portions of both. The air entering through the duct 34' passes down through the baffles 71' of the first passageway 42' and then encounters a series of fluff removing screens 48'. In this modified embodiment, such screens are arranged in vertically stepped relation with succeeding screens spaced from each other, and extending across the entire width of the passageway 42'. The side edges of each screen are removably mounted on transversely extending supporting bars 49', or upon any other suitable frame structure, and these screens can be cleaned in place or removed for cleaning through a normally closed opening 50' in the front or side wall of the casing 41'. The spray projected against the under sides of said screens retains the same wet so that fluff will adhere thereto. It will be understood that such screening arrangement may be employed in the embodiment shown in Fig. 5, or, the screen arrangement illustrated in such latter figure may be employed in the construction shown in Fig. 6.

If it should be desired to subject the air to the presence of lime for extracting carbon dioxid, a lime tray or basket 68' may be mounted in the passageway 42', below the screens 48', and in position to be removable through the opening 50'.

The air in passing up through the secondary spray chamber 43' will have all free water removed therefrom in passing through the baffles 71' at the upper end of such chamber. The air then passes down through the outer passageway 44' and through a lower passageway 106, below the tank 54' to a centrifugal fan F mounted on the motor shaft 94 below the motor 58'. A horizontal wall 108, defining the bottom of the passageway 106, has an opening therein through which the air passes to the center of the fan F. Said fan is enclosed in a housing portion 109 depending from the transverse wall 108, and the air is impelled from this fan through the housing portion 109 into the passageway 88 which communicates with the duct 89 leading back into the lower plenum chamber of the incubating enclosure. Interposed in the passageway 88 is a heating element 73', preferably electrically operated, through which all of the air must pass before it is returned to the incubating enclosure. Such heater is controlled by the dry bulb thermostat T, as described of the heating element 73 in the preceding embodiment. It will be noted that said heating element is located on the discharge side of the fan F, posterior thereto with reference to the direction of air flow, so that the heat imparted thereby to the air can have no influence tending to heat the motor 58' and the bearings of the fan.

A suitable rotary water pump P is also operatively connected with the motor shaft 94. Such pump is preferably arranged within the confines of the fan F, for securing a compact assembly, and has its stationary housing supported on legs 113, which are secured to a removable bottom plate 114 closing an opening in the bottom of the housing portion 109. This opening is sufficiently large to permit the fan F and motor 58' to pass down through the same, whereby, when it is desired to remove this assembly it is only necessary to release the impeller S from the upper end of the shaft 94 and to lower the motor and fan down through said opening. Water is drawn from the tank 54' down through pipe 116 to the inlet port of the pump P. Leading from the outlet port thereof is a pipe 117 which divides at the T connection 118 into the two branch pipes 119 and 121. The latter pipe extends up to a cooling tower CT and flow through this pipe is governed by an automatically controlled valve 123. A return pipe 124 leads from the bottom of the cooling tower back to the conditioning unit C1. The pipe 119 functions as a by-pass in shunt of the tower, connecting at its upper end with a thermally insulated aerator A in which a spraying operation takes place for dissipating to the atmosphere any carbon dioxid or other objectionable gas which has been absorbed by the spray water in the conditioning unit. A return pipe 124a leads from the return receptacle of this aerator and connects with the return pipe 124 leading from the cooling tower. A spring pressure valve 125 may be interposed in the by-pass pipe 119 and a check valve 126 may be interposed in the return pipe 124 between the cooling tower CT and the aerator A. Hence, it will be seen that when the automatic valve 123 is closed, the entire supply of water from the pump 112 is shunted around the cooling tower through the aerator A and returned directly to the conditioning unit. When the automatic valve 123 is open all, or practically all, of the pump water is circulated through the cooling tower CT and is then returned to the conditioning unit. The return pipe 124 enters the conditioning unit at a point to discharge upon the fluff screens 48', so that a portion of the return water will cascade down over these fluff screens for maintaining the same in a wet condition and for wetting the fluff caught thereon. A portion of this return water is conveyed laterally through a branch pipe 124b having spray orifices therein through which this water is sprayed down upon the baffles 71' at the upper ends of both spray chambers. The continuous wetting of these baffle surfaces aids materially in the absorption of carbon dioxid and other objectionable gases from the conditioning air, the impingement of the air against such surfaces resulting in the absorption of such gases in the water.

The cooling tower is preferably situated above the building in which the incubating enclosure is located, or is situated in any other desired location where it will have a free circulation of air therethrough. The pipe leading thereto connects with a plurality of overhead spray nozzles 127 discharging down into a collecting receptacle 128, from whence the water is returned to the conditioning unit through the return pipe 124.

The circulation of air through the spray chamber of the tower is preferably controlled by a thermostatically regulated shutter 129 disposed at one side or end of the tower. This shutter is constructed similarly to and operates like the radiator shutters commonly employed on automobiles, and hence a detailed description thereof is not necessary. The thermally responsive mechanism thereof indicated at 129a is so adjusted that on hot summer days the shutter will open wide for allowing an unrestricted circulation of air through the spray chamber, and on relatively cooler days the shutter will restrict the circulation of air. The tower unit CT functions in hot weather as a cooling device or source of cold for holding the temperature of the spray water in the conditioning unit down to the point where it can exercise the proper cooling and humidifying influence on the circulated air, thereby avoiding the necessity of refrigerating apparatus for this purpose.

The aerator A may have a like arrangement of overhead spray nozzles 127a discharging down into a collecting receptacle 128a. However, while this aerator is constructed and arranged so that gases liberated therein are readily dissipated to the atmosphere, the spray water therein is thermally insulated against temperature influence of outside atmosphere. This is effected by sheathing or enclosing the entire device with a porous heat retaining material 130. When the spray water from the conditioning unit is passing through the aerator the carbon dioxid and other gaseous content absorbed in the spray water are liberated to the atmosphere without having the water appreciably influenced by atmospheric temperature, whereas when the water is passing through the cooling tower the gaseous content is liberated (the cooling tower functioning as an aerator at this time) and at the same time the water is cooled by the atmosphere. In extremely cold winter weather it will usually be necessary to heat the spray water and such is effected by an electrical heating unit 77' disposed in the tank 54' and having its supply circuit controlled by an automatic switch 131. The aerator A as illustrated is constructed to provide limited ventilation to the atmosphere but is substantially heat insulated.

I shall now describe the control apparatus by which the aforesaid regulating operations are performed. Disposed at any desired point in the system is a dew point thermostat H for sensing the dew point of the circulating air. Preferably, this instrument is located in the return air duct 34' or in proximity thereto where it will sense the dew point of the air prior to the air entering the spray chambers 42' and 43'. This dew point sensing device may have different principles of operation and may be constructed in various ways. For example, according to one principle of operation, the air is brought into contact with a relatively cool condensing surface which brings about a condensation of the vapor content of the air upon such surface, and the temperature of this condensate substantially at the time of precipitation is sensed as the dew point of the air. According to another principle of operation, the air is brought into heat transferring contact with a coil through which a liquid coolant of lower temperature is circulated, and the exterior surface of such coil is finned and is so proportioned in surface area that the precipitation of dew thereon raises the temperature of the coolant approximately to the dew point of the air, whereupon this temperature of the coolant is sensed as the dew point of the air.

Both principles of operation are fully disclosed in the co-pending application filed by myself and Otto A. Labus on November 16, 1928, under Serial No. 319,764, and inasmuch as the details of such device in and of themselves form no part of the present invention, I shall not describe the same here. Assuming the last mentioned principle of operation to be employed, it will suffice to say that a liquid coolant, consisting of water at a relatively low temperature, is continuously conducted through pipe 134 to an externally finned heat transfer coil 135 extending in sinuated or zigzag formation across the lower end of the return air duct 34'. By the precipitation of dew on portions of the surface of said coil, the temperature of the coolant circulating therethrough is gradually raised substantially to the dew point of the air. This coolant is then conducted through pipe 136 to a chamber 137 in which a thermally responsive element 138 senses the temperature of such coolant as the dew point of the air. The coolant is discharged from said chamber through a pipe 139 connecting with the return pipe 124 leading down from the cooling tower CT. The thermally responsive element 138 has any suitable operating connection 141, consisting either of mechanical means or a liquid column, with a main controlling contact 142 pivotally mounted on a control switch device 143. Disposed to one side of said contact are two contacts 144 and 145, the contact 144 being flexibly or pivotally supported whereby in the initial movement of the main contact 142 to the left a circuit will first be established down through contact 144, and if the motion of the main contact continues in this direction, the contact 144 will be moved to the left for engaging the contact 145 and establishing a second circuit down through this latter contact.

The same arrangement of contacts 146 and 147 is provided on the opposite side of the main contact 142, the contact 146 being movably supported whereby it is first engaged by the contact 142 and is thereafter moved over into engagement with the other contact 147 with continued movement of the main switch contact 142 to the right. Extending from the four contacts 144 to 147, inclusive, are four wires 144', 145', 146' and 147', the first three of which connect with relays 148, 149 and 150, respectively, the last wire 147' connecting with the relay 149. Current is supplied to the control system through two supply wires 152 and 153, the wire 152 connecting with the movable control contact 142 and also connecting with one terminal of each of the three relays 148—150. The other supply wire 153 connects with other terminals of each of these relays. The specific construction of these relays need not be described, as such are well known.

It will suffice to say that when the relay 148 is energized, a circuit is completed over wires 154 to the heat control switch 131 for actuating said switch to control the operation of the heating element 77'; that when the relay 149 is energized a circuit is established over wires 155 to operate the electromagnetic valve 102 for controlling the supply of spray water to the well 101; and, that when the relay 150 is energized a circuit is established over wires 156 to operate the electromagnetic valve 123 for controlling the passing of spray water from the conditioning unit up into the cooling tower CT.

Relays 148, 149 and 150 are diagrammatically shown in detail in Fig. 6A and as shown each has a relay electromagnet 148a, 149a and 150a respectively which electromagnets are energized when circuits are completed by the main contact 142 of the control switch device 143. These relays have contact armatures 148b, 149b and 150b respectively which when attracted by their respective electromagnets engage contacts 154a, 155a and 156a respectively to close the circuits thereby energizing the respective lines 154, 155 and 156 from the two supply wires 152 and 153. In addition to these elements relay 149 is provided with a holding armature element 149c which positively retains the contact armature 149a in circuit closing position after the electromagnet 149b is deenergized; electromagnet 149d in this relay, when wire 148' is energized by contact 142 moving to energize contact 147, is energized and thereby withdraws holding armature element 149c and permits armature 149b to retract and deenergize the lines 155 controlled by this relay.

The operation of this control apparatus is substantially as follows:—When the dew point of the air falls to a particular point, such as a half degree below the predetermined desired dew point, the control contact 142 swings to the left and engages contact 144. This establishes a circuit from conductor 152 through contacts 142, 144 and wire 144' to relay 149, resulting in the latter being energized. Such operates through the circuit 155 to open the spray water control valve 102 for admitting water from the tank area 54' to the spray well 101, whereupon spray or an additional volume thereof, is projected into the spray chambers 42', 43' from the impeller S. The tendency of this spray is to bring the dew point of the air back to its desired value. This automatically controlled supply of spray water with a lowering of the dew point may be regarded as the initial or primary corrective operation for bringing the dew point back to its desired value. If this initial corrective operation fails to stop the lowering of the dew point, the control contact 142, in continuing to move to the left, will swing the contact 144 over into engagement with the contact 145, thereby completing a circuit through wire 145' to the relay 148. The energization of such relay operates through the circuit 154 to actuate the switch 131 and energize the heating element 77' for heating the spray water. Such constitutes the secondary corrective operation for restoring the dew point to its desired value, such operation occurring when the dew point has fallen say 1 degree from its desired temperature. The heating of the spray water is quickly effective to raise the dew point.

As the control contact moves back towards its intermediate position and the pivoted or flexible contact 144 is allowed to move away from the contact 145, the relay 148 is deenergized and the heating of the spray water is discontinued.

The switch element of the relay 149 is so constructed that it will remain closed after the control contact 142 has backed away from the contact 144, thereby resulting in the continued energization of the electromagnetic valve 102 and the continued supply of spray water to the well 101. When the dew point rises, say a half degree, the control contact 142 in engaging the contact 146 energizes the relay 150, thereby resulting in the electromagnetic valve 123 being operated to direct the spray water from the pump P up into the cooling tower CT. Such constitutes the primary or initial corrective step for lowering the dew point, it being evident that the cooling influence of the tower on the spray water will tend to lower the dew point. If the dew point continues to rise, say to one degree above its desired temperature, the control contact 142 swings the contact 146 over into engagement with the contact 147, thereby completing a circuit down through wire 147' to the relay 149. The circuit through such wire energizes a secondary winding in the relay 149 for moving the switch element to open position, it being remembered that this switch element was left in closed position when the control contact 142 separated from the contact 144.

In consequence, the circuit through wires 155 is opened and the valve 102 is closed for cutting off the further admission of spray water to the well 101. The resulting subsidance of spray in the chambers 42', 43' constitutes the secondary corrective step or operation for bringing a relatively high dew point down to its desired value, such operation quickly effecting a lowering of the dew point. For extreme winter operation, the circulation up to the cooling tower CT can be shut off by closing a valve 160 in the pipe 121.

The dew point control is correlated with a dry bulb temperature control for governing the temperature of the air. The dry bulb thermostat, diagrammatically indicated at T, is preferably located in the incubating enclosure as described of the preceding embodiment, although it will be understood that such thermostat may be disposed at any other point in the air circuit. A control contact 158, governed by the thermally responsive means of the device, is adapted with a falling air temperature to engage contact 161, and with a rising temperature to engage contact 162. When the control contact engages terminal 161, a circuit is completed through a relay or directly with the heating element 73' which raises the temperature of the air as it is being circulated back into the incubating enclosure. When the air temperature rises to a predetermined point, the engagement of the control contact 158 with the terminal 162 completes a circuit through wire 164 to energize the relay 150. Such results in the opening of the valve 123 for directing the spray water from the pump P up to the cooling tower CT. The consequent lowering of the temperature of the spray water operates to lower the temperature of the air delivered to the incubator and hence the temperature of the incubator.

Ozone is supplied to the system from an ozone generating machine G which communicates with the conditioning unit C1 at a point on the discharge side of the spray chambers 42' and 43'. In the arrangement illustrated, ozone, in the proper proportion, is conducted from the machine G through conduit 86' to the passageway 106, although it will be obvious that, if desired, the conduit 86' can connect with the passageway 88 or return duct 89.

In summarizing the steps or operations involved in the treatment of the circulating air, as effected by this latter embodiment of the invention, it will be seen that the dew point of the air is sensed by the sensing device H which, through its control apparatus, regulates the humidity by governing the projection of spray into the chambers 42', 43', or, under certain conditions, by increasing or decreasing the temperature of the spray water. The temperature of the air, i. e., its dry bulb temperature, is maintained between very close limits through the instrumentality of the dry bulb thermostat T which, under one condition, effects the direct heating of the air, and, under another condition, effects the cooling of the spray water for reducing the temperature of the air. For extracting carbon dioxid from the air, lime may be utilized as described of the preceding embodiment, although the absorption of the carbon dioxid in the spray water will most generally be adequate to remove all of the carbon dioxid content of the air. Such is particularly true in the present embodiment owing to the use of the cooling tower and aerator A.

That is to say, because of the difference of carbon dioxid partial pressure between the circulating conditioning air and the spray water, the water will absorb the carbon dioxid, and then when the spray water is circulated up through the cooling tower CT or through the aerator A the atmospheric air will absorb this carbon dioxid from the spray water because of the difference of partial pressures between the atmosphere and the carbon dioxid content of the spray water. With the giving up of the carbon dioxid from the spray water to the atmospheric air, oxygen will take its place in the spray water within the device CT or A and will be returned to the conditioning system with the spray water serving as the conveying medium. This will follow by reason of any difference of partial pressure of oxygen between the outside atmospheric air and the conditioned air circulated through the system. Even when no spray is being projected by the spray device S water is nevertheless being circulated through either the cooling tower CT or aerator A, and the return water therefrom projected by return spray pipe 124b down upon the baffles 71' provides for absorption of carbon dioxid and other objectionable gases in such return spray and on the surfaces of said baffles. Hence, the continuous circulation of the spraying water through the cooling tower and aerator provides for continuous dissipation of carbon dioxid and other objectionable gases to the atmosphere and the continuous resupplying of oxygen to the system without the necessity of a foul air outlet and a fresh air inlet, whereby the system may be maintained completely closed so that a considerable saving is effected in heating or cooling the air, and a more accurate regulation of temperature and humidity is obtained.

In Figs. 3 and 4, I have illustrated another manner of carrying out my invention, wherein the air supplied to the incubating eggs is handled more or less separately from the air supplied to the hatching eggs.

When the eggs reach the hatching period, such usually corresponding to the last three days of incubation, they are placed in a separate hatching enclosure I'. Such enclosure is preferably arranged within the main housing of the incubating enclosure, but is partitioned off therefrom by an end partition 172 and doors 173 closing the sides of the hatching enclosure and opening into the aisles 22. In such arrangement, the conditioning unit C1 only handles the air circulating through the hatching compartment I'. To this end, the duct 34' leading to the conditioning unit may communicate with the upper end of the enclosure I' below the false ceiling 25, or the upper plenum chamber 26 may be partitioned off to provide a separate plenum chamber 26' communicating solely with the upper end of the hatching compartment I', in which case the conduit 34' will connect with this separate plenum chamber 26'. Similarly, the return duct 89 may communicate with the lower end of the hatching compartment I', or may communicate with a separate plenum chamber 31' partitioned off from the main plenum chamber and communicating only with the lower end of the hatching compartment.

The air circulating through the incubating eggs is handled by a separate conditioning unit, designated C2 in its entirety. As shown in Figs. 3 and 7, such conditioning unit is preferably structurally combined or directly associated with the conditoning unit C1, comprising a single air passageway 175 defined between the side wall 41' of the unit C1 and an outer casing wall 176. The upper end of said passageway communicates with a duct 177 which connects with the main upper plenum chamber 26, and the lower end of the air passageway 175 communicates with a duct 178 which connects with the main lower plenum chamber 31, whereby the air rising through the incubating eggs is circulated through the upper plenum chamber 26, down through the conditioning passageway 175 and back through the duct 178 into the lower plenum chamber 31 for repeated circulation up through the eggs. Interposed in the passageway 175 is an electric heater 73" for heating the air. Such heater is controlled by a dry bulb thermostat T' disposed either in the incubating compartment or the enclosure, or in the return air duct. Such control may be effected substantially as described of the dry bulb thermostatic controls T, T of the preceding embodiments. Continuous air circulation is maintained by a blower or fan F' operatively connected with an electric motor 183, such fan or blower being preferably disposed at the lower end of the passageway 175 for discharging into the return duct 178.

The humidity of this secondary volume of air circulated through the conditioning unit C2 is governed by drawing humidified air from the first volume of air circulated through the conditioning unit C1. As shown in Fig. 7, this can be accomplished by providing an opening 184 between the return duct 89 and the lower end of the passageway 175, and controlling such opening by a louvre 185 responding to humidity conditions in the incubating compartment of the enclosure.

The humidity sensing in such compartment may be effected by a hygrostat, a wet bulb thermostat, or a dew point thermostat, either being generally indicated at H' in Fig. 4, and being set to maintain the desired humidity on the incubating compartment. The control connections between such sensing instrument and the louvre damper 185 may be of any desired electrical or pneumatic type, the element 187 in Fig. 7 representing an electromagnetic motor device for actuating the damper under the control of switch mechanism actuated by the humidity sensing instrument H'. It will hence be seen that when the inclubating air is at the desired humidity, the two volumes of air are circulated through their respective conditioning units as separate entities, but when the humidity of this incubating air falls below its desired value, some of the humidified air from the hatching cycle is transferred to the incubating cycle to make up such deficiency in humidity.

If desired, the conditioning unit C1 may operate exactly as described of the construction shown in Fig. 6. In such event, the dry bulb thermostat T would be disposed in the hatching compartment I', as shown in Fig. 4, or in one of the ducts communicating therewith, for controlling the dry bulb temperature of the air, and the dew point sensing instrument H would govern the projection of the spray, the heating of the spray water by the electric heating element 77, and the cooling of the spray water by circulation through the cooling tower CT as heretofore described and shown with reference to Fig. 6.

However, by way of illustrating a modified arrangement, I have shown in Fig. 7 a slightly different method of controlling the conditioning operations occurring in the unit C1. The control of the dry bulb temperature of the air is effected in substantially the same manner previously described in connection with Fig. 6, but the control of the humidity is effected in a different manner. The pump P forces spray water through the pipe 117 up to the cooling tower CT, but the flow of water up to the cooling tower is governed by a valve 189 operatively connected to be controlled by a float 191. This float responds to the level in the water tank 54', and when such level exceeds a predetermined maximum the float opens the valve 189 for permitting water to be forced up to the cooling tower CT. When the float controlled valve is closed, a by-pass circulation occurs through a spring controlled vlave 192 connecting with a pipe 193 extending up to the spray pipe 193' which discharges down upon the baffles 71' which are disposed at the upper end of the second spray chamber 43'. Thus during all the time that a by-pass circulation is occurring through pipe 193 water is being sprayed upon these baffles 71', and likewise during all the time that water is being returned from the cooling tower CT, through return pipe 124, water is also being sprayed upon the fluff screens 48'. In such embodiment the cooling tower CT has a relatively large storage reservoir for retaining a large volume of relatively cool water.

The return pipe 124 leading back from such reservoir to the conditioning unit has a regulating valve 194 interposed therein and responsive to humidity conditions in the hatching compartment. This humidity condition may be sensed by a dew point sensing instrument H as illustrated in Fig. 6, or by a hygrostat or wet bulb thermostat. The control connections between such humidity sensing instrument and the valve 194 may be electrical, as described of the valve 123 in Fig. 6, or they may be of any other desired type. The arrangement is such that when the humidity of the circulating air rises above a predetermined value, the valve 194 is opened for allowing some of the relatively cool water from the cooling tower to discharge down into the conditioning unit over the fluff screens 48' and at the same time over the baffles 71' by way of pipe 193 and spray pipe 193'. The lower temperature of this water has the effect of immediately lowering the humidity. As the water level in the tank 54' rises with this inflow of water from the cooling tower, the float controlled valve 189 is opened and more water is circulated from the pump P up to the cooling tower for replenishing the supply in the storage reservoir 128. A lowering of the humidity of the circulated air beyond a predetermined point exercises the previously described control over the heating of the spray water.

Ozone or formaldehyde may be supplied to the two volumes of air by separate generating devices, or sources of supply, or it may be drawn from a single unit. In illustrating the former arrangement, I have shown two ducts 86' and 86" extending from separate generating machines G to the passageways 106 and 175.

A killing or relatively strong concentration of ozone will generally be supplied to the hatching air, and an inhibiting or relatively weak concentration will generally be supplied to the incubating air, the apparatus G, 86', 86" being adjusted for supplying these different concentrations. The ozone supplied to both compartments of the closure is assimilated as oxygen by the eggs and by the chicks.

In this embodiment of Fig. 7 I have also shown another method of purifying the air of bacteria, which method may be employed in conjunction with the supplying of ozone, formaldehyde, etc., or which may be employed in lieu thereof. At any desired point in the air path in the conditioning unit C1, preferably adjacent to the inlet end thereof, the air is brought into intimate contact with a locally circulated body of liquid which is subjected to the germicidal action of ozone, ultra-violet rays or any other purifying medium. Such liquid, which may be water, is contained in a reserve tank 195 disposed within the upper part of the first spray chamber 42'. From this tank the liquid is drawn into a motor driven pump 196 and is then impelled through a purifying device 197. As above remarked, this purifying device may employ ozone, ultra-violet rays or any other germicidal medium for purifying this locally circulated body of liquid. From the device 197 the liquid is conducted to spray nozles 198 which discharge into the air path and back into the tank 195.

The entering air is directed into the path of this spray by an inclined partition 199 which extends down through the baffles 71, thereby defining an inner section of baffles 71a upon which the spray from the nozzles 198 discharges. The air is brought into intimate contact with the purifying liquid at this point, by commingling with the spray and by impingement against the section of baffles 71a wetted by the spray. The air then passes down around the end of the partition 199, coming into contact with the surface area of the liquid in the tank 195, and is directed upwardly through a section of baffles 71b defined between the partition 199 and the end wall 195' of the tank. In passing up through this latter section of baffles the air is scrubbed of entrained particles of this purifying liquid, which are precipitated back into the tank 195. Thereupon the air passes down through the third section of baffles 71c, defined between the tank wall 195' and the partition wall 45', and enters the water spray zone 42'. It will be seen that the germicidal liquid is kept separate and apart from the spray water, and preferably is not absorbed as a vapor by the air. This method permits the use of a germicidal agent of a concentration which would not be permissible if the air conveyed such agent through the enclosure. The bacteria removed from the air by the purifying liquid are effectively eliminated in the purifying device 197, through which such liquid is continuously circulated.

This same purifying method and apparatus may be employed in association with the incubating air circulating through the unit C2, and may also be employed in connection with conditioning units for brooders, which will be hereinafter described.

In Fig. 8 I have illustrated a modified arrangement of apparatus embodying certain new steps in the method of controlling the temperature of the air and in the method of governing the humidity thereof. One feature of this modified construction is the use of a heat interchanger 201 interposed in the air path between the incubating enclosure and the conditioning unit. For clarity of illustration, I have shown the heat interchanger and the conditioning unit in spaced or separated relation, but it will be understood that in the physical embodiment of the structure these two devices can be enclosed within the same housing or grouped directly together. The main body of the interchanger 201 comprises a plurality of tubes, partitions, or other arrangement of walls defining a first series of passages 202 extending in one direction and a second series of passages 203 extending in the opposite direction.

The return air from the incubator enters the interchanger through duct 34' and travels through passageways 202 to an outlet 204 with which the opposite ends of all of these passageways 202 connect. The outlet 204 conveys the air to the admission port of the conditioning unit. After passing through said unit the conditioned air is conveyed through duct 205 to the ends of the other series of passageways 203. Flowing back through these second passageways the conditioned air enters a header 206, connecting with the opposite ends of all of said latter passageways, and through this header the conditioned air is conveyed into the incubating and hatching enclosure. In such embodiment the air heating element 73' is transferred from the conditioning unit to the header 206, so that such heater only exerts its heating influence on the conditioned air after such air has passed back through the passageways 203 of the interchanger. The return air travelling in one direction through the passages 202 and the conditioned air travelling in the opposite direction in the passages 203 bring both quantities of air into intimate heat transferring relation whereby the return air gives up some of its heat to the conditioned air so that the temperature of the return air is lowered prior to entering the conditioning unit and the temperature of the conditioned air is raised prior to entering the incubating enclosure. By this desirable interchange of heat there is effected a considerable saving in heating energy as the heating element 73' does not have to raise the temperature of the conditioned air through as large a temperature rise as is necessary when the interchanger is not employed.

It will be understood that such interchanger can be employed with any of the previously described embodiments of Figs. 5, 6 and 7. The automatic control of the electric heating element 73' may be effected in any of the different ways previously described.

In this embodiment the circulation of the spray liquid is from the tank 54' to the pump P and from said pump up through pipe line 121' to the cooling tower CT and the aerator A. The pipe 121' connects with two branch pipes 208 and 209 leading respectively to the cooling tower and to the aerator. The flow through the branch 208 to the cooling tower is controlled by an automatic regulating valve 123', and a spring pressed valve 211 is interposed in the branch 209. When the automatic valve 123' is closed the pressure of the liquid opens the valve 211 and all of the liquid is directed to the aerator A. When the automatic valve 123' opens the major portion, if not all of the liquid, is directed to the cooling tower CT, the spring pressed valve 211 seating, or substantially seating, at this time. The return pipes 124 and 124a lead down from the cooling tower and aerator and connect with nozzles 52a in the spray chambers of the conditioning unit, a check valve 126' being interposed in the return pipe between the cooling tower CT and the aerator A in the same manner as disclosed in Fig. 6.

Humidity control may be effected in the present embodiment in the same manner as described of the preceding embodiments, but as illustrative of another method of regulating humidity, I have illustrated apparatus for reducing the vapor pressure of the spray liquid by the measured addition of a soluble or semi-soluble, such as salt, lime, calcium chlorid, glycerine, alcohol, carbon tetrachlorid, etc.

In the simplified form of apparatus illustrated in Fig. 8, a portion of the spray water is arranged to be circulated through a tank or other mixing device M containing the chemical adapted to form a solution or a semi-immiscible mixture with the water. For example, if salt is employed the water is passed down through a salt bed confined within the tank M between an upper distributing plate 213 and a lower screen strainer 214. A part of the pump circulation can be caused to enter the mixing device M through a pipe 215 branching from the pipe 121', the water or solution being returned to the spray water tank 54' through pipe 216. A measured restriction is interposed in the branch pipe 215 so that only a limited proportion of the pump circulation can pass through the mixing device M. An automatic control valve 217 is also interposed in the branch pipe 215 so that the restricted circulation of spray water through the mixing device M can be started and stopped pursuant to the humidity requirements of the system.

Referring now to the control apparatus, a dew point sensing instrument H or other like device is operatively connected to move a switch contact 221 with the rise and fall of the dew point from its predetermined value. Disposed to one side of the main switch contact 221 are three pivotally mounted contact members 222, 223 and 224. The two outer contact members 222 and 224 are electrically connected by a jumper connection 225. The contact member 224 carries a contact movable into and out of engagement with a stationary contact 226 from which one wire of the control circuit extends, as will be presently described.

An insulating block 227 is mounted on the contact member 224, and motion is transmitted from the intermediate contact 223 through said insulating block to the member 224. When the main switch contact 221 moves in this direction, it first engages contact 222 and completes a circuit through wire 225, and member 224 to the contact 226. Continued movement of the main switch contact in this direction swings the contact 222 over against the intermediate contact 223 and completes a separate control circuit leading from said latter contact. Simultaneously therewith the intermediate contact member 223 swings over against the insulating block 227, thereby swinging the contact member 224 away from the stationary contact 226 and interrupting the previously established circuit extending from said latter contact. One side of a control circuit 228, 228' is connected with the main switch contact 221. A wire 229 extends from the contact terminal 226 to the electromagnetically operated valve 217 which controls the flow of spray liquid through the mixing device M. A wire 231 extends from the intermediate contact member 223 to the other electromagnetically operated valve 123' controlling the circulation through the cooling tower CT. When the humidity rises above its desired value, the main contact 221 is caused to move to the right to engage with the contact 222. This completes a circuit through wire 229 to the automatic valve 217, thereby opening said valve and permitting a certain proportion of the pump capacity to flow through the mixing device M.

The consequent addition of the solvent or other chemical in such mixing device to the spray water reduces the vapor pressure thereof and, hence, tends to lower the humidity. This constitutes an initial corrective step for preventing undue rise of humidity. If the humidity continues to rise the continued movement of the main switch contact 221 swings the contact 222 over against the intermediate contact 223 and completes a circuit through wire 231 to the automatically operating valve 123′. This permits the spray water from the pump to be circulated down through the cooling tower, resulting in a reduction in temperature of the spray water, such constituting a second corrective step for lowering humidity. Simultaneously with the engagement between the contacts 222 and 223, or shortly thereafter, the contact 223 swings the contact 224 away from is associated stationary contact 226, hereby interrupting the circuit through wire 229 and resulting in the closing of the valve 217 so that thereafter all of the pump capacity is caused to circulate through the cooling tower.

In this embodiment of Figure 8, the area of the liquid particles projected from the spray nozzles 52*a* is determined by the pressure heads in the aerator and cooling tower. Thus, it is apparent that if a low water level exists in either the aerator or cooling tower, or in both, the pressure head will be correspondingly low, and the liquid will be projected from the spray nozzles in the form of relatively large drops. However, if all of the spray liquid is directed to the cooling tower, for example, the pressure head in the tower will rise, and the pressure of the liquid being discharged from the nozzles will be increased, the spray therefore being in a finer condition. Thus the superficial area of the spray projection will be controlled by the height of the liquid in either the aerator or cooling tower. Further, it is within the scope of the present invention to incorporate the spray projecting means S of Figure 6, in the embodiment shown in Figure 8, in which case the area of the spray drops projected will be determined by the quantity of liquid in the tank 101, and by the speed of the motor 58′, since the peripheral speed of the liquid coming out through the jets 98 will determine to a large extent the size of the drops. It is apparent that this control of the spray particles will affect the heat transfer between the liquid and the air stream, and, also, will affect the heat transfer between the colder liquid particles and the water vapor in the air stream, causing a variation in the humidifying or dehumidifying effect of the liquid in accordance with the size of the spray particles.

When the humidity falls below its desired value, the main switch contact 221 moves to the left from its normal position and engages a contact 233. This completes a circuit through wire 234 which controls heating means 77' in the spray tank 54'. Preferably this heating means is of the electrical type and the circuit wire 234 may be arranged to conduct the heating current thereto, or such circuit may control a relay which in turn governs the main supply circuit of the heating element.

It will be understood that this control circuit 234 may, of course, control an electrically operated valve for a steam supplied heating device, if desired.

The dry bulb temperature of the air is sensed by a thermostat T which is arranged to actuate a switch contact 158'. When the temperature rises above its desired value, such switch contact engages with contact 162' and completes a circuit through wire 231' to the cooling tower valve 123'. The consequent opening of such valve and the circulation of the spray water through the cooling tower lowers the temperature of the spray water and operates to lower the dry bulb temperature of the air. When the air temperature falls below its predetermined value, the switch contact 158' moves in the opposite direction and engages contact 161', thereby completing a circuit through wire 235 to the air heating means 73'. Preferably this heating means is electrical in its operation, as described of the preceding embodiments, although it will be understood that it may be steam operated, if desired.

When using a water soluble solvent in the mixing device M, the recovery of such solvent, if desired, can be accomplished in a still or outside air spray drier or air washer handling the spray fluid and utilizing hot outside air as the drying vehicle. As another manner of securing the desired conditioning operation, the invention also contemplates utilizing either glycerine, alcohol, soluble oils or other solvents, or coloida solution media in the liquid state, and using this in the spray apparatus either alone or admixed with water or other liquid. Such could be supplied from a device M under automatic throttling control of a valve like 217.

In certain conditioning uses of the apparatus it may be desirable to employ any of the above mentioned or other chemicals as the principal or sole volume of the spray liquid, the particular chemical being chosen so as to remove by physical contact or chemical interaction any gases or solid matter from the stream of air or gas being treated. In such instances water may be admixed with the main volume of chemical under proper humidity control for governing the vapor pressure of the air or gas being treated.

A sufficient charge of this liquid for a day's operation may be provided in the mixing chamber, and such fluid recovered from the spray water by any suitable separating operation, such as by the use of an ordinary cream separator; or suitable apparatus may be provided for continuous solvent recovery. As before remarked, the automatic valve 217 may be employed to govern the admixture of the spray water and the liquid solvent. Preferably, the solvent which is employed is an effective solvent for the gas or gases which it is desired to remove from the air.

Under some climatic conditions where the cooling tower CT is not adequate to reduce the temperature of the water, refrigerating coils may be employed, with the automatic valve 123a arranged to control either the circulation of the water in contact with the coils or the circulation of the refrigerant through the coils, for governing the heat transfer from the water to the refrigerant, as shown in Fig. 8A wherein a heat exchanger 124a is positioned in the circulating conduit 124 for example through which the water passes in contact with refrigerant coils 124b therein for cooling the spray liquid for this purpose but obviously these refrigerating coils may be otherwise positioned with respect to the spray water circulating conduits. Refrigerant supply to coils 124b is controlled by the valve 123a and may be operated by the same control means as that of valve 123' which controls the circulation of the water through the cooling tower. Under other conditions where a source of relatively cold water is available, such water may be introduced into the water circulating system under the throttling control of the automatic valve 123b also shown in Fig. 8A in a cold water supply pipe 124c, which valve is similarly controlled by the same control means as that of valve 123a or 123' for lowering the temperature of the spray water.

Under climatic conditions when the outdoor wet bulb temperature is higher than the desired wet bulb temperature in the incubator, the regulation of the humidity of the conditioned air may be effected by dry adsorption.

In Figure 8 such an adsorber is diagrammatically indicated at 237, the same being preferably located in the air passageway 44' between the baffles 71' and the blower F.

The air in passing through said adsorber is brought into contact with a suitable adsorbent material such as calcium chlorid, silica-gel, green sand, or the like. The air is then cooled by being brought into contact with cooling pipes 238 in which is circulated relatively cool well water or a refrigerant. When using a refrigerant, the dew point of the air is reduced in the absorber 237 to a temperature below that of the temperature of the coolant so as to prevent the formation of frost on the surfaces of the cooling coil 238. An electrically operated regulating valve 239 is connected through wire 231'' with the temperature control apparatus T to govern the amount of water, refrigerant or other coolant circulating through the coil 238; or the amount of dehumidifying can be controlled either by regulating the amount of air which passes to the adsorber, or by regulating the degree of adsorption, either of which can be controlled by the dew point setting of the dew point sensing instrument. Such regulating means is clearly shown in the prior copending Labus and Crawford application Ser. No. 297,764 and is therefore not here illustrated. It will also be noted that valve 239 may be operated in parallel with valve 123' by either the temperature control apparatus T or by the dew point sensing instrument H; the cooperative functioning of these instruments has been fully set forth hereinbefore in connection with the previously described embodiments and it is intended that such refrigerating equipment may be incorporated in any of these embodiments where the climatic conditions are such that the cooling tower CT is not adequate to sufficiently reduce the temperature of the water.

The invention also contemplates the provision of automatic apparatus for maintaining in the incubator, hatcher or brooder and in the conditioning unit a higher air pressure than that of the surrounding atmosphere. This avoids infiltration of atmospheric air into the system through cracks and small openings in the enclosure or in the conditioning unit and makes it easier to maintain the desired conditions in the system. Such apparatus is illustrated in Fig. 8 and comprises a motor driven fan or blower 241 connected to discharge into the enclosure or into the air circuit at any other point.

The inflow of air into the system is governed by a pressure responsive circuit controller 242 comprising an inclined tube having upwardly extending legs at its opposite ends, the low end of the tube communicating with atmosphere as indicated at 243 and the elevated end of the tube communicating with the interior of the enclosure or air circuit through a duct 244. A column of mercury 245, or other conducting liquid normally stands in the lower leg and extends part way up the inclined portion of the tube. This column of mercury is in continuous electrical contact with one side 246 of a control circuit. When the pressure within the enclosure falls relatively to atmospheric pressure, the column of mercury moves upwardly in the inclined tube and engages contact 247, thereby completing a circuit from wire 246, through the mercury and contact 247, to a wire 248 leading from said contact and constituting the other side of the control circuit. Such circuit may be connected directly to the blower motor 241' for stopping and starting the same, or said circuit may be connected to an electromagnetically operated damper 249 arranged to control the flow of air from the blower 241 into the enclosure, such blower then being constantly operating; however, as shown the circuit is such as to control both simultaneously which is preferable where the blower is operated by an individual motor so that it can be shut down independently of other motor operated equipment. The construction and arrangement of the tube 245 and contact 247 is preferably such that when the pressure within the enclosure falls approximately to atmospheric pressure, the control operation will occur for boosting the pressure within the enclosure and thereby preventing infiltration of atmospheric air.

It will be understood that such pressure governing method and apparatus may be employed with any of the previously described embodiments of conditioning apparatus. It will also be understood that, if desired, the operating arrangement may be reversed so as to normally maintain a lower pressure in the enclosure to avoid exfiltration, i. e., the leakage of conditioned air out of the circuit and into the surrounding atmosphere, as shown in Fig. 8B in which the blower 241 is connected to withdraw air from the system and the damper 249 is likewise operated to open in accordance with a decrease in the differential of the air pressure on the outside over that within the enclosure. In this instance the controller 242 is reversed and the contact 247 operates to energize the circuits for discharging air from the enclosure should the pressure therein increase to or above the pressure outside thereof. Thus the pressure in the enclosure may be maintained at a sub-atmospheric pressure so as to maintain an infiltration through enclosure openings and cracks instead of an exfiltration therefrom.

As remarked in the forepart of the specification, the present invention also includes the maintenance of proper conditions in a brooding enclosure. It is generally desirable to maintain a lower temperature and a higher relative humidity but a lower absolute humidity in the brooding enclosure than in the incubating enclosure, and the invention comprehends a novel relation of cross-connecting the two enclosures whereby the desired conditions are maintained in both with a maximum conservation of heat energy, etc. Referring to Fig. 9, the incubating enclosure I and the brooding enclosure B are both illustrated as being provided with conditioning units C1 of the construction shown either in Fig. 5, 6, 7 or 8. In the case of the conditioning unit C1 for the brooder, the dry bulb thermostat thereof will be set to maintain a lower temperature within the brooder than is maintained in the incubator, and the dew point sensing instrument, hygrostat or the like, will be set to maintain a higher humidity in the brooder than in the incubator. Connecting the two conditioning units is a conduit 261.

This conduit is intended to supply cooler air from the brooder system to the incubator system and accordingly at the brooder the duct is connected in the system on the discharge side of the fan or blower F' and at the incubator end is connected to the system at the intake side of the fan or blower, whereby the pressure differential between the discharge and intake sides of the two blowers is utilized for compelling air flow through the conduit 261.

Controlling the flow through said conduit is a damper device 123a which is operatively connected to be responsive to the dry bulb temperature, or the humidity, or both, in the incubator. For example, such damper may be controlled by the dry bulb thermostat T in the incubator whereby a rise in the air temperature therein above a predetermined value will operate to admit some of the relatively cooler air from the brooder. As alternative arrangements, the damper 123a may be controlled by the dew point sensing instrument H or other humidity responsive device so that with a rise in humidity, cool air and a lower absolute humidity will be admitted from the brooder; or such damper may be controlled through a relay 150, as in Fig. 6, which relay in turn is responsive both to a dry bulb thermostat and a humidity responsive device so that this cool air will be admitted to the incubator either with an abnormal rise in temperature or humidity. In the latter arrangement, which is preferred, it will be noted that this damper 123a functions analogously to the water valve 123 of Fig. 6, and the specific manner of controlling the damper will be apparent from the preceding description of the valve control.

It will be noted that in each of the above described arrangements the brooder system constitutes a source of low temperature or cold, thereby taking the place of the cooling tower CT in so far as maintaining proper conditions in the incubator is concerned. Another conduit 263 may be extended between the incubating and brooding enclosures, or between the upper inlet portions of the two conditioning units C1 and C2. Interposed in such conduit is a weighted back damper 264 which is normally closed. This conduit and back damper prevents the possibility of an excessive air pressure building up in the incubator. The incubator and brooder may be supplied with ozone from a common ozone generating machine, or separate generating devices G and G' may be employed as illustrated. An inhibiting concentration will generally be supplied to the brooder.

In some instances it may be desirable to associate the two conditioning devices C1 and C2 with the incubator, or to associate only the conditioning unit C2 therewith, the latter practice being made possible by virtue of the cross connection with the brooder.

In Fig. 10 I have illustrated this arrangement. The conditioning unit C2 can be regarded in one practice as conditioning all of the air circulated through the incubator, or can be regarded in another practice as operating in conjunction with the conditioning unit C1, with the latter conditioning the air circulating through the hatching compartment, as previously described.

In either of these instances, the conduit 261 is preferably connected with the passageway 175 of the conditioning unit C2, such point of connection being preferable although not essential, since the induced draft created by the blower F'' then stimulates circulation through the conduit 261. A damper 123b in the conduit 261 is preferably connected to respond to a dew point sensing instrument H or a hygrostat or other like device whereby said damper will be opened when the humidity either in the incubating or hatching compartment, depending upon which practice is followed, rises above a predetermined value. When the two conditioning units C1 and C2 are both employed in conjunction with the hatching and incubating enclosures, the louvre damper 185 connecting these two units will be placed under the control of a dew point instrument, hygrostat or the like so that said louvre will be opened when the dew point in the incubating compartment falls below a predetermined value. In such arrangement, employing both conditioning units C1 and C2, the conduit 261 is also provided with a branch 261' communicating with the unit C1, preferably adjacent to the air inlet end of said unit. Regulating the air flow through this branch is a damper 123c which is controlled automatically by a dew point instrument or other device H for sensing the humidity within the hatching compartment so that when this humidity rises above a desired value the damper 123c will be opened for admitting the cooler air from the brooder.

As shown in the embodiment of Fig. 10, the upper cross conduit 263 may be provided with separated branches leading to the two conditioning units C1 and C2 or leading separately to the incubating and hatching compartments, and interposed in these separate branches are normally closed, weighted back dampers 264 and 264'. If desired, a fresh air intake 265 may be provided for the brooder, corresponding to standard air conditioning practice, and a damper 266 in this intake is preferably automatically controlled by dew point sensings in the brooder to open and admit fresh air when such dew point rises above a predetermined value.

The invention also contemplates the transference of heat energy between the incubator and brooder by an arrangement wherein the spray water is utilized as the heat conducting medium. By virtue of the fact that the dry bulb temperature in the incubator is higher than in the brooder, the spray water in the conditioning unit of the incubator will generally be higher in temperature than the spray water in the conditioning unit of the brooder. Fig. 11 diagrammatically illustrates an arrangement wherein this higher temperature spray water in the conditioning unit of the incubator is transferred to the conditioning unit of the brooder for controlling humidity or temperature conditions in the brooder. The arrangement of the conditioning apparatus for the incubator I may be substantially a duplication of that disclosed in Fig. 6, or any of the other previously described conditioning units and arrangements thereof may be employed. The spray water is circulated by the pump P up through pipe 271 to the aerator A. The return water from this aerator passes through a three-way valve 272 which, in its normal position, directs this return water through a pipe 124 leading back to the conditioning unit and discharging over the baffles and fluff screens substantially as described of Fig. 6. Such valve in its other position closes admission to the pipe 124 and directs all of the water from the aerator A to the cooling tower CT, the general construction of such three-way valve being old and well known.

Said valve is automatically controlled by humidity control means H utilizing either a dew point sensing instrument, a hygrostat, or the like, substantially as previously described, such humidity control responding to humidity conditions in the incubator I. Normally the spray water does not pass through the cooling tower, but when the humidity rises the valve 272 is operated to direct the spray water through the cooling tower for lowering the temperature of said water. The valve is preferably electromagnetically operated as described of the other control valves, although it may be pneumatically or mechanically operated if desired. The spray water returned from the cooling tower CT is likewise sprayed over the baffles 71' and over the fluff screens.

Extending from the spray water tank of the incubator conditioning unit is a pipe 274 which discharges into the spray water tank of the conditioning unit associated with the brooder B, the levels of the two tanks being preferably such that flow normally tends to occur from the incubator unit to the brooder unit. Interposed in said pipe is a control valve 275 which is responsive to humidity control means H associated with the brooder B. This valve may also be controlled either electrically or mechanically in response to a dew point sensing instrument, a hygrostat or the like, arranged to sense humidity conditions in the brooder, the operating arrangement being such that when the dew point in the brooder lowers below its desired value, the valve 275 is opened for admitting some of the higher temperature spray water from the incubating unit to the brooder unit.

When the humidity in the brooder rises above its desired value, the humidity control means H may be arranged automatically to open the damper 266 in the fresh air inlet 265 as described of Fig. 10. Water is supplied to the system through a float controlled valve 104 responsive to the level in the spray tank of the incubator unit. Hence, as water is supplied from the incubator unit to the brooding unit, the replenishing supply of water enters the incubator end of the series. When the water level in the spray tank of the brooder unit rises above a predetermined level, through transference of heated water thereto from the incubator unit, overflow occurs through the overflow pipe 65'. The thermal units in the transferred water enable the humidity, or temperature, in the brooder unit to be held up to the desired value without the necessity of a source of heat, and consequently conserves operating energy for the combination.

Fig. 12 illustrates how a single cooling tower CT may be arranged to serve a plurality of enclosures, whether the latter be incubating, hatching or brooding enclosures. In such arrangement, the cooling tower is of relatively large storage capacity, and the warm water from the conditioning units of all of the enclosures is conducted through the pipes 121 up to the spray nozzles of the tower. The cooled water is returned from the storage reservoir of the tower through the return pipes 124 to the individual conditioning units.

The pumped circulation of the spray water from each conditioning unit up to the cooling tower may be governed by a float controlled valve 191 substantially as described of the operating arrangement illustrated in Fig. 7. The return feed to each conditioning unit may be governed by a control valve 194 responding to humidity or temperature requirements in the particular enclosure under the regulating action of appropriate control means, such as the humidity control means H, also as illustrated in Fig. 7. Thus, all of the conditioning units can draw from this common source of relatively cool water in accordance with their individual requirements. Fig. 12 also illustrates how a single germicidal device G may be connected for supplying ozone, formaldehyde, or other germicidal agent to a plurality of enclosures, the degree of concentration conducted through the pipes 86' being adjusted for the requirements of each enclosure.

Fig. 13 illustrates another arrangement wherein spray water is conducted from unit to unit for transferring thermal energy between the units in the maintenance of the proper conditioning requirements in each of the units. In the arrangement of the three units I, I' and B, an overflow pipe 274 conducts water from the spray tank of the unit I to the spray tank of the unit I', and a similar overflow pipe conducts overflow water from the latter tank to the tank of the unit B. The pump discharge from the conditioning unit of the brooder B communicates with two pipes 278 and 279, the former leading back to the conditioning unit of the incubator I and the latter leading back to the conditioning unit of the hatching enclosure I'.

Interposed in each of these pipes is a control valve 278' and 279', respectively, such valves being electromagnetically operated and being subject to the control of dew point or humidity control means H and H' associated with the incubating and hatching units I and I'. When the dew point in the incubating enclosure rises, the valve 278' is opened to permit flow of water through the pipe 278 to the conditioning unit of this enclosure. Similarly, when the dew point in the hatching enclosure I' rises, the valve 279' opens and permits water to flow through the pipe 279 to the conditioning unit of the hatching enclosure. Associated with the spray tank of each conditioning unit is an electric water heater 77. The switch 143 comprising part of the humidity control means associated with each unit has one contact connected to control the valve 278' or 279' associated with that unit, and has its other contact connected with the electric heater 77 in the spray water tank. Under normal operating conditions, the spray water in the incubating unit will be higher in temperature than the spray water in the hatching unit, and the temperature of the spray water in the hatching unit will be higher than that of the spray water in the brooder unit. Assume now that the dew point in the incubator unit should rise above its desired value, the control means H will respond to energize the valve 278' and permit some of the lower temperature spray water to be circulated from the brooder unit through the pipe 278 to the incubating unit.

The admission of this lower temperature spray water will operate to lower the dew point in the incubator unit. Any overflow from the spray tank of the incubator unit will pass through the first overflow pipe 274 to the tank of the hatching unit I'. If, on the other hand, the humidity in the incubating unit should fall below its desired value, the control means H will respond to energize the electric heater 77 and raise the temperature of the spray water, thereby raising the dew point of the conditioned air. The same operating relation is true of the hatching unit I'. A raising of the dew point operates through the control means H' to open the valve 279' for permitting the inflow of the lower temperature spray water from the brooder unit to the hatching unit, and conversely, a lowering of the dew point operates through this same control means to energize the electric heating element 77. It will be understood that the conditioning unit associated with each of the enclosures I and I' has a complete spray water circuit substantially as described of the preceding embodiments, the same not being shown because of the previous description thereof. The admission of relatively cooler spray water from the brooder unit to the incubating and hatching units takes the place of the cooling tower in the spray water circuits of each of these units. The spray water circuit for the conditioning unit of the brooder B may be confined entirely within the conditioning unit or such circuit may include a cooling tower if the situation requires lowering of the temperature of the brooder spray water.

The humidity control means H associated with the brooder operates to energize the electric heater 77 when the dew point should be raised, and operates to energize the electromagnet actuating means for the fresh air damper 266 in order to open this damper when the dew point should be lowered. The pipes 278 and 279 are so connected in the spray water circuit of the brooder unit that a static water pressure is constantly maintained in the pipes 278 and 279 so that the lower temperature water is instantly supplied to the other units upon the opening of the valves 278' and 279'. A spring pressure valve may be suitably interposed in the spray water circuit of the brooder unit for maintaining this static pressure in the pipes 278 and 279. I have not described in detail all of the wires making up the different control circuits, since they will be obvious from the drawing and from the preceding description. Water is supplied to the entire combination through a float controlled inlet valve 104 in the spray water tank of the brooder unit, which valve maintains a substantially constant level of water in said tank. A suitable overflow drain may be provided in the latter tank to limit the maximum level of the water therein.

Figure 14:
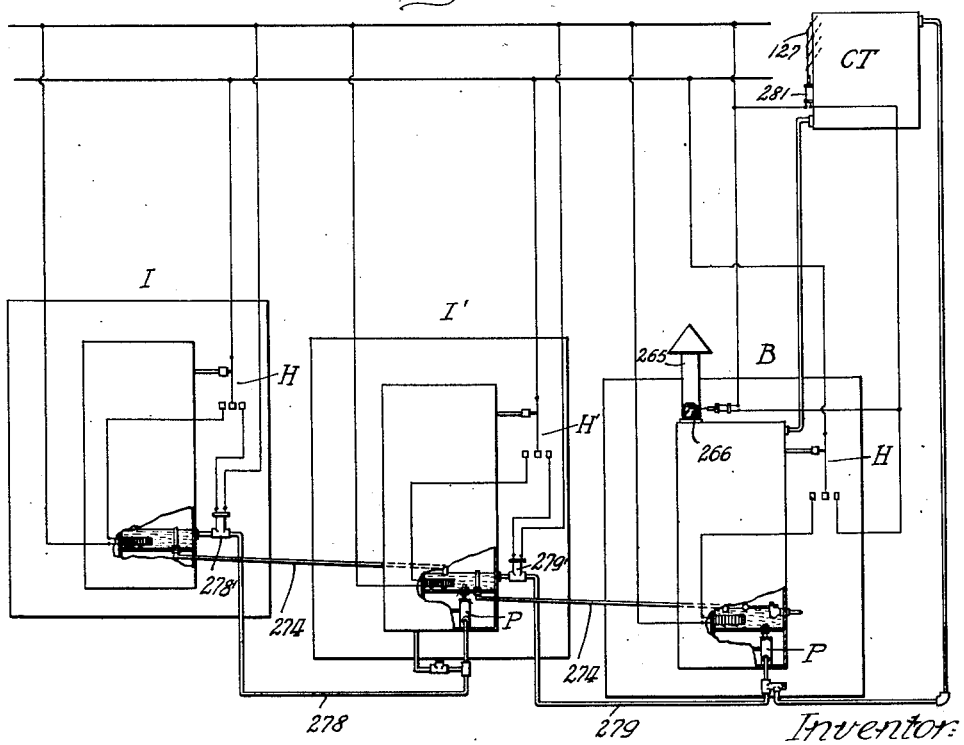

Fig. 14 illustrates another arrangement generally similar to Fig. 13, differing therefrom principally in the fact that the cooler spray water conducted to the conditioning unit of the incubator I is supplied from the conditioning unit of the hatching enclosure I' rather than from the conditioning unit of the brooder.

The cooler spray water supplied to the intermediate hatching unit I' is obtained from the conditioning unit of the brooder in the same manner as described of Fig. 13. In the modified arrangement of Fig. 14, the pipe 278 extends from the pump of the hatching unit I' so that the lower temperature spray water supplied to the incubating unit is drawn directly from the hatching unit. The other pipe 279 extends from the pump of the brooding unit to the spray water tank of the hatching unit, as described of Fig. 13. The three spray water tanks are connected by the overflow pipes 274, 274, flow through the pipes 278 and 279 being governed by the automatic valves 278' and 279' in the same manner as above described. In this modified arrangement, I have shown the spray water for the brooder unit as being circulated through a cooling tower CT, for lowering the dew point in the brooder, although it will be understood that refrigeration, the admission of fresh air or the admission of relatively cool well water may be employed to lower the dew point. In the arrangement illustrated, I have shown the humidity control means H as operating to admit fresh air through the damper 266 and as operating to open the shutter 127 of the cooling tower, through the instrumentality of the electromagnet 281, when it is necessary to lower the dew point in the brooder.

Figure 15:
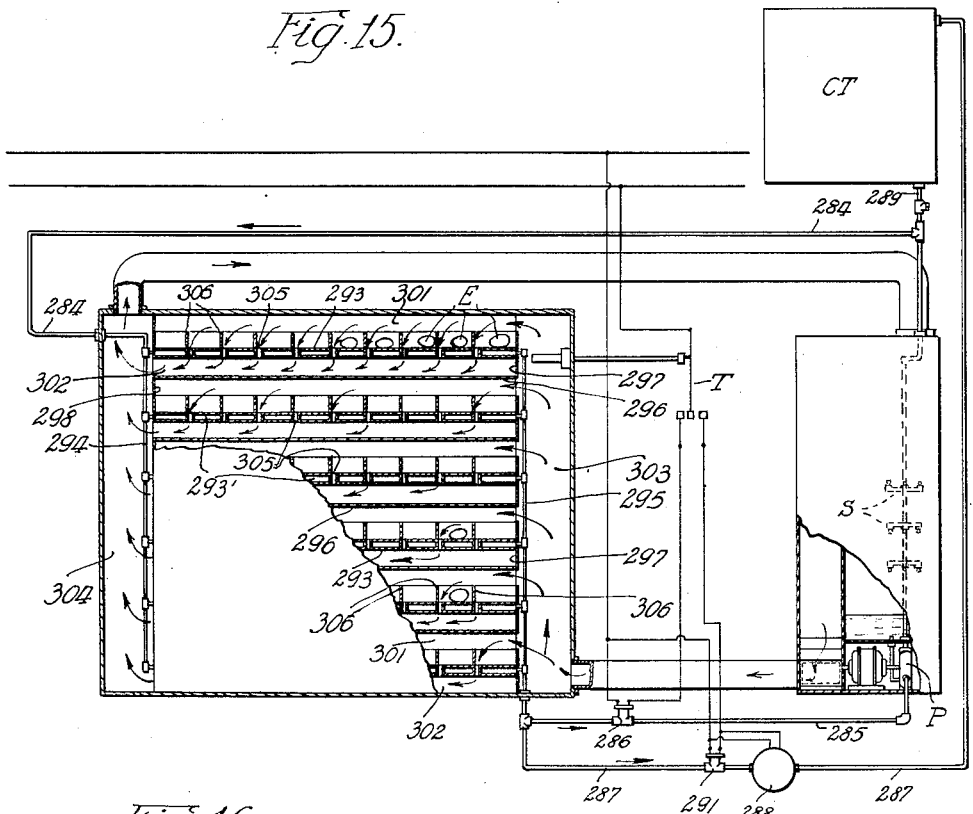
Fig. 15 is a diagrammatic view of an embodiment wherein water is circulated through the enclosure.

In Figure 15 I have illustrated a modified arrangement of control system wherein a thermal transfer occurs within the enclosure between the water and the air or objects within the enclosure. The enclosure may be either an incubating, hatching or brooding chamber. For convenience of illustration, the air conditioning unit is shown in spaced relation to the conditioned enclosure, such air conditioning unit being of the construction of any of the preceding embodiments. Preferably the spray apparatus of the air conditioning unit is arranged so that it can be connected in circuit with water passageways in the enclosure, and to this end the discharge from the pump P is conducted up through spray apparatus S and that portion of the water not projected from the spray nozzles is conducted to a pipe 284 extending to the enclosure. Here the water is circulated in contact with heat exchanging surfaces within the enclosure, and this water is thence conveyed back through pipe 285 to the spray water tank or to the inlet of the pump P. An automatic valve 286 is interposed in the pipe 285 and is controlled by a temperature control device T. Preferably this temperature control comprises a thermostat located within the enclosure or at a point to sense the temperature therein, and connected to actuate a switch in such manner that when the temperature within the enclosure falls below a predetermined point the valve 286 is energized and moved to open position. Thus, for winter or other relatively cool climatic conditions, the circuit for the water will be through the air conditioning unit to the heat transfer surfaces in the enclosure and thence back to the air conditioning unit.

For summer or relatively warm weather operation, the water circuit is arranged to include a cooling tower CT. At such time the valve 286 will be closed and the water returning from the enclosure will pass through pipe 287 to a separate motor driven pump 288 and thence through a continuation of the pipe 287 up to the spray nozzles in the cooling tower CT. The cooled water is conducted through pipe 289 to the pipe 284, in which it is conveyed back to the heat exchange surfaces in the enclosure. Interposed in the pipe 287, preferably on the inlet side of the pump 288, is an automatic valve 291 which is responsive to the other side of the temperature control device T. That is to say, when the temperature within the enclosure rises above a predetermined point, the control switch T completes a circuit to energize the valve 291, thereby resulting in the water circulation being conducted up through the cooling tower CT for lowering the temperature thereof. The spray water tank of the conditioning unit preferably has a float controlled inlet valve for replenishing the supply of water as described of the preceding embodiments. It will be understood that the pump P also draws from this spray water tank.

As previously stated, the enclosure may be an incubating or hatching chamber, in which case the water circulated therethrough absorbs the radiant heat from the eggs, or such enclosure may be a brooding chamber, in which case this water absorbs the heat emitted from the bodies of the chicks.

The heat thus absorbed by the water will, under most conditions, avoid the necessity of heating the spray water in the air conditioning unit when the water circulation is through pipe line 285. This absorbed heat may be utilized in a dry air heater or in a heater in the spray water tank, if desired. In passing through the enclosure, the water may be circulated through hollow walls lining the enclosure or through coils or other heat absorbing surfaces. As illustrative of one method of circulating the water through an incubating or hatching enclosure, I have illustrated a series of superposed hollow shelves or trays 293 on which the eggs E are supported. Each shelf 293 comprises upper and lower spaced walls defining a chamber 293, therebetween, through which the water is circulated. The water entering through pipe 284 is conducted through a header 294 communicating with each of the chamber areas 293'. Connecting with the other ends of these chamber areas is a header 295 which conducts the heated water to the two pipe lines 285 and 287. The construction shown also comprises a novel method of circulating the air through the enclosure. Extending horizontally between adjacent shelves 293 are partitions or baffles 296. Each partition is joined at one end with the shelf directly above it through a vertical end wall 297, and at the opposite end is joined with the shelf directly below it by an end wall 298. Such arrangement defines an air admission passageway 301 extending over each shelf, and an air discharge passageway 302 extending under each shelf. All of the air admission passageways communicate with a manifold space or riser 303 into which air is supplied from the conditioning unit, and all of the discharge passageways 302 communicate with a similar manifold space 304 at the opposite end of the enclosure, such latter manifold space being connected to return the air to the conditioning unit.

Extending through each tray 293 are a plurality of air passages 305 for circulating the air from each admission passageway 301 down through the shelf to the discharge passageway 302. Each of the passages 305 may be constructed in the form of a sleeve or thimble of properly proportioned bore so that the air circulation will be uniformly distributed over the entire upper surface of the shelf, and these sleeves or thimbles may be thermally insulated from the metallic construction of the shelf or may be composed of heat insulating material. The eggs E may each be placed in a separate compartment defined by the longitudinal and transverse partitions 306 so as to prevent lateral flow of air from egg to egg. One of the passageways 305 leads down from each of the separate egg compartments. The eggs may be placed directly on the shelves 293, or may be supported in insulated plates or baskets resting on such shelves.

It will be observed that the foregoing method of circulating the air results in the air flowing straight down through the eggs with no transverse flow, such being advantageous because it prevents the air from carrying bacteria or contamination from one egg laterally to another. Moreover, it will be noted that any given portion of the air stream only passes through one layer or quantity of eggs, rather than down or up through successive layers, such also avoiding contamination from egg to egg.

Figure 16:
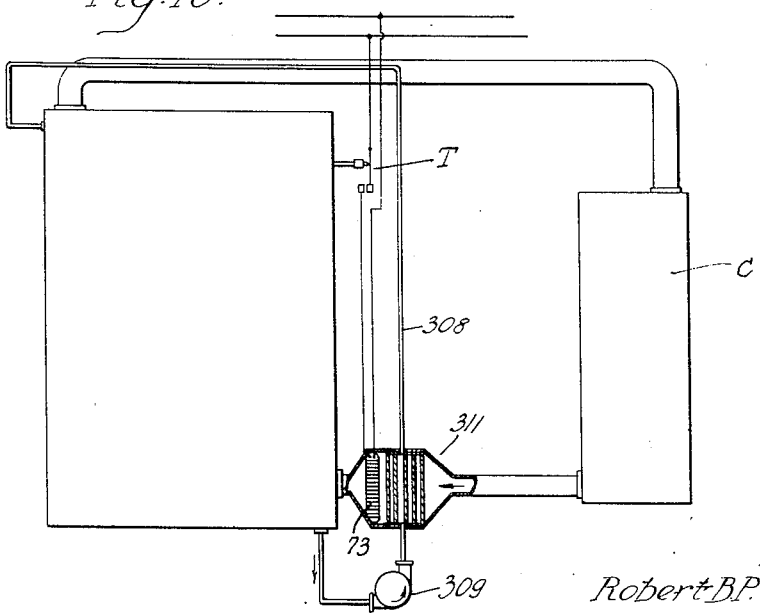

In Fig. 16 I have illustrated a modified arrangement utilizing this water circulation through the enclosure. The water is circulated through hollow shelves, hollow walls or other heat absorbing surfaces in the enclosure, the circuit for this flow being completed outside of the enclosure by a pipe 308 in which a circulating pump 309 is interposed.

A heat exchanger or economizer 311 is interposed in the water and air circuits for bringing the water and air into heat transferring relation. Preferably this heat exchanging device is disposed in the duct returning the conditioned air from the conditioning unit to the enclosure. Such device comprises any suitable arrangement of passages or coils with the water contacting one side of the heat transferring surface and the air the other. The heat picked up by the water from the eggs or chicks is transferred to the air stream at the economizing device 311 so that the temperature of the air is raised with a consequent saving in the heating of the air. The electric heater 73, or such other heater as may be employed, is disposed in the return air duct between the economizing device 311 and the enclosure, such heater only supplying such additional heat as may be required to raise the air to the desired dry bulb temperature in the enclosure. This heater is automatically controlled by a temperature control apparatus T, as described of the preceding embodiments. The conditioning unit, designated C, may be constructed in accordance with any of the preceding embodiments of conditioning units. The water circulation in pipe 308 may be through hollow shelves 293, as in Fig. 15, if desired.

Fig. 17 illustrates another modification of the arrangements shown in Figs. 15 and 16. In this embodiment the conditioning unit C draws its air from a fresh air intake 265, and after this air is properly conditioned and tempered in the unit it is impelled through duct 314 to the enclosure, which may be either an incubating, hatching or brooding enclosure.

The exhaust air is discharged from the enclosure through a discharge duct 315 which conveys such air to an interchanger 316 in the inlet duct 314. This interchanger may be substantially of the construction designated 201 in Fig. 8, or may be of any suitable construction comprising a series of passageways with the exhaust air contacting with one side of a surface or surfaces and transferring its accumulated heat to the entering air contacting with the other side of said surface or surfaces. This exhaust air may be discharged to the atmosphere after passing through the interchanger 316. The water circulated through pipe 308 by the pump 309 may also be arranged to pass through an interchanger 311 in the entering air duct 314, as previously described of Fig. 16. The water circulated through the pipe 308 may be caused to pass through hollow partitions, walls, or through hollow shelves 293, as described in Fig. 15. It will be seen that by the provision of the two heat interchanging devices 311 and 316, substantially all of the heat picked up from the eggs or chicks by the air circulated through the enclosure and by the water circulated therethrough can be returned to the air entering the enclosure so that a decided thermal economy is obtained. This point of heat return or heat interchange is not necessarily limited to the duct 314, as either, or both, of the interchangers 311 and 316 may be arranged to transfer heat to the air entering the conditioning unit through the fresh air intake 265 if desired. In the arrangement illustrated the interchangers 311 and 316 may be transposed for placing the unit 316 on the air inflow side of the unit 311.

Such additional heat as it may be necessary to supply to the entering air may be obtained from one or more heating units 73, 73'. In the arrangement illustrated, the heater 73' is interposed in the duct 314 at a point beyond the two interchangers 311 and 316 so that this heater will be in position to boost the air temperature beyond the temperature resulting from the heat transfer at the interchangers 311 and 316. Such heater is connected to contact 317 of the temperature control apparatus T, whereby with a lowering of the temperature within the enclosure beyond a predetermined point the heater 73' will be energized. When the heater 73 is employed in the conditioning unit C, it is electrically connected with contact 318 of this temperature control apparatus. Preferably these contacts are arranged so that the heater 73' will be first energized with a falling temperature, and thereafter the heater 73 will be energized if the temperature continues to fall, but this arrangement may be reversed if desired. The conditioning unit C may be constructed in accordance with any of the preceding embodiments.

The invention also contemplates an arrangement wherein some of the air circulated through the enclosure, preferably the major proportion of such air, is circulated through a closed conditioning unit having no outside communication with the atmosphere, but wherein a second conditioning unit will function to take atmospheric air and condition it and then introduce such air into the enclosure for maintaining the desired conditions therein.

In Fig. 17, for example, the air supplied to the enclosure from the conditioning unit C may only be a relatively small proportion of the air within the enclosure or being conditioned therefor, there being another conditioning unit connected in a closed circuit with the enclosure substantially as described of the preceding embodiments illustrated in Figs. 5, 6, 7 and 8, etc. Such an arrangement has more particular application to brooding enclosures, although it may also be employed in connection with incubating and hatching enclosures. Fig. 18 illustrates a modified embodiment of such arrangement. The enclosure is designated X and the conditioning unit which supplies atmospheric air thereto is designated C3. Such conditioning unit has an individual motor 58 and fan or blower F, the atmospheric air being drawn into the unit through the fresh air inlet duct 265 and being impelled into the enclosure by the fan F. The other conditioning unit, having closed circuit communication with the enclosure, is designated C4. The conditioning unit C3 is of relatively small capacity, ranging preferably between five per cent to twenty per cent of the capacity of the large unit C4. One of the important objects in employing the unit C3 to introduce atmospheric air into the enclosure is to maintain therein a static pressure higher than atmospheric pressure so as to prevent the infiltration of atmospheric conditions into the enclosure through any small openings, crevices, etc., corresponding somewhat to the purpose of the fan or blower 241 in Fig. 8.

In fulfilling this purpose the unit C3 need not be of very large capacity and, hence, the operations of conditioning the relatively small volume of atmospheric air introduced through said unit does not require the use of large apparatus, nor does it require expensive, large capacity sources of heat or cold for conditioning this comparatively small volume of atmospheric air. A source of heat for the small unit C3 is represented by the heating element 73' electrically connected to be responsive to thermostatic control apparatus T, which in turn is responsive to the temperature within the enclosure. A source of cold may be provided in this conditioning unit in any one of several ways. For example, a cooling coil may be interposed therein and arranged to have refrigerant or any other coolant circulated through said coil under the control of the temperature and humidity control devices to be presently described. In the arrangement illustrated, I have shown the conditioning unit C3 as being provided with spray apparatus S and the desired cooling effect is had by introducing relatively cold water to the spray system or otherwise reducing the temperature of the spray water. Where relatively cold water is adapted to be supplied to the spray apparatus, such is introduced into the spray circulation through a pipe 321 connecting with an automatic 3-way valve 272' which governs the source of the supply water fed to the inlet of the pump P. When this valve is in its normal position, water is drawn from the spray water tank of the unit through pipe 322 and passes through the automatic valve 272' to the inlet of the pump for projecting from the spray nozzles. When the valve is energized in response to a temperature or humidity sensing, the flow through the pipe 322 is cut off or restricted and relatively cold water is supplied to the pump through the pipe 321. The overflow pipe 65' leads from the spray water tank back to the refrigerator coils or other cooling source from which the pipe 321 draws its supply.

The automatic valve 272' is electrically connected with contact 323 of the temperature control device T and is also connected with contact 324 of the humidity control device H, the latter being either a hygrostat, a dew point sensing instrument, or any other apparatus for sensing humidity.

The relatively large conditioning unit C4 may be of any suitable design, comprising primarily the fan or blower F, motor 58, pump P, and spray apparatus S. When this unit is operating, the fan or blower F circulates a relatively large volume of air from the enclosure X through said unit, such air being maintained in a closed circuit substantially out of contact with the atmosphere. The principal conditioning operation occurring in this large unit is that of saturating the air circulated therethrough, such being effected by a relatively intense spray discharge from the spray apparatus S. If desired, a heating operation may also occur in this large conditioning unit to supplement the action of the heater 73' in the small unit C3. To this end a heater 73 may be interposed in the large conditioning unit and electrically connected to respond to the temperature control apparatus T. The heater 73' in the small unit is connected with a contact 326 which is engaged by the main switch contact when the temperature within the enclosure falls below a predetermined point. Such energizes the heater 73' and results in the entering atmospheric air being tempered in the unit C3. If this is not adequate to bring the temperature within the enclosure back to its desired point, the continued movement of the main switch contact swings the contact 326 over against contact 327 and completes the circuit for the other heating element 73, whereby any air which may be circulating through the large conditioning unit will also be raised in temperature. The motor 58 of the large conditioning unit is connected with a contact 328 of the humidity control device H, a relay being interposed in this motor circuit if desired for handling the heavy current flow.

The operation of this embodiment is substantially as follows:—The small conditioning unit C3 operates substantially constantly for the purpose of introducing a sufficient volume of outside air into the enclosure to maintain an interior pressure somewhat higher than atmospheric pressure, whereby to avoid infiltration of atmosphere into the enclosure through small openings therein. The large conditioning unit C4 only operates intermittently in accordance with the humidity regulation within the enclosure. If the humidity falls below a predetermined value, the humidity sensing apparatus H establishes a circuit through contact 328 and starts the motor 58 of this large unit operating. This results in a relatively large volume of air being drawn from the enclosure, circulated through said conditioning unit, and returned to the enclosure, and in passing through the unit the air is substantially saturated. If the humidity should rise above a predetermined value this same control apparatus completes a circuit through contact 324 and results in the air passing through the small unit C3 being lowered in humidity or temperature by cooling of the spray water therein or by other use of a refrigerant or source of cold.

At this time the large conditioning unit C4 is not operating, the motor 58 being inert because of the opening of its circuit at the contact 328. If the temperature should fall below a predetermined point, a circuit is established through contact 326 to energize the heating element 73' for raising the temperature of the entering air introduced through the unit C3. If this is not sufficient, a secondary circuit will be established through contact 327 to energize the other heating element 73 which will operate to heat any air which may be circulating through the large conditioning unit C4. If the temperature should rise above a predetermined point, a circuit is established through contact 323 to supply cold water or a refrigerant to the small conditioning unit C3 for reducing the temperature of the air being introduced into the enclosure.

This principle of introducing a sufficient volume of conditioned atmospheric air into the enclosure for preventing infiltration, and of conditioning the air within said enclosure by treatment within a large capacity, closed circuit conditioning unit, is capable of numerous adaptations to enclosures requiring different air conditions, and is characterized by the ability to effect a decided economy in equipment and operating expense due particularly to the relatively small refrigerating load necessary to its operation. Such can be best illustrated by assuming certain supposed values of temperature and humidity, which illustrate an improved method of adiabatic cooling which may be employed in certain adaptations.

For example, it will be assumed that the small conditioning unit C3 introduces air into the enclosure at a 70° saturated temperature. It will also be assumed that when the conditioning unit C4 starts operation the air drawn into such unit from the enclosure has a dry bulb temperature of 88 degrees, a dew point temperature of 74 degrees, and a wet bulb temperature of 78 degrees. It will be noted that there is no external control of the temperature of the spray water in the large conditioning unit, hence this spray water assumes the wet bulb temperature of the air. Such air, in passing through this conditioning unit, will be substantially saturated, with the result that its dry bulb, dew point and saturated temperatures will all be approximately 78 degrees when this air is re-circulated back into the enclosure. The adiabatic cooling effected in such unit is equal to the heat equivalent of the water evaporated between the change from a 74° dew point to a 78° dew point. Hence, by virtue of this adiabatic cooling occurring within the large conditioning unit C4, the refrigerating load imposed on the small conditioning unit C3 is greatly reduced. The relatively low temperature of the air introduced from this small conditioning unit C3 into the enclosure affords not only a comparatively dry cooling of the air handled by the unit C3, but also results in a larger adiabatic cooling in the unit C4. The above mode of conditioning can be obtained with either a fixed or a fluctuating dry bulb temperature in the enclosure X, depending upon whether a fixed thermostatic control or a fluctuating dew point control is used.

This principle is also adaptable to high humidity conditions within the enclosure, where the dry bulb temperature of the air entering the enclosure from the conditioning unit C3 is below the dew point required within the enclosure, as in cold storage plants. For example, it will be assumed that the air entering the enclosure from the unit C3 has a dry bulb temperature of 55 degrees and a dew point of 53 degrees, and that the desired conditions within the enclosure are approximately a 60° dry bulb temperature, a 58° wet bulb temperature, a 57° dew point, and a 90 per cent saturation. Under these conditions, there will be a cooling within the enclosure corresponding to the air supplied through unit C3 times the specific heat of air times the difference between interior and entering dry bulb temperatures (60 degrees minus 55 degrees) plus the water evaporated in unit C4 times the latent heat of evaporation. This cooling effected within the enclosure and the conditioning unit C4 greatly diminishes the refrigerating load which must be carried by the conditioning unit C3.

The principle is also adaptable to low humidity conditions where the humidity within the enclosure is relatively low, generally below that present in the outdoor atmosphere, and where the humidity in the enclosure is not subject to much rise. In such adaptation the small conditioning unit C3 will be provided with dehumidifying means such as the spray apparatus shown employing relatively cold spray water, or such as a chemical absorber, chilled surfaces, or the like.

In such arrangement, the dehumidifying action of the unit C3 will be subject to the control of the humidity controlling device H, whereby the air introduced into the enclosure by the unit C3 will be at a relatively low dew point. Moreover, in such arrangement, the spray apparatus S will be eliminated from the large conditioning unit C4 and such unit will have heating and cooling means characterized by dry surfaces. For example, the heater 73 may be employed for heating the air and a refrigerating coil 238' may be interposed in one of the air passes of the unit, substantially as described of Fig. 8, for cooling the air. These heating and cooling devices will be under the control of the temperature controlling device T, substantially as hereinbefore described, so that the temperature in the enclosure will govern the operation of the heating device 73 and the cooling device 238'. As an alternative arrangement, the temperature control device T can be arranged to govern the volume or flow of air through the conditioning unit C4, in which event a substantially fixed rate of circulation of refrigerant may be maintained through the cooling coil 238'. In either of these adaptations the conditioning unit C4 will govern the temperature of the air within the enclosure without objectionably increasing the humidity of such air. In each of the above described adaptations wherein a separate conditioning unit supplies conditioned atmospheric air to the enclosure to prevent infiltration of unconditioned atmospheric air, the fan F of such conditioning unit may be operated constantly, or may be operated intermittently only to the amount required to maintain the desired pressure differential between the interior and the exterior of the enclosure.

The various forms of the invention herein illustrated and described have been devised principally for the poultry industry, to-wit, the conditioning of incubating, hatching and brooding enclosures, and numerous features of the invention are essentially interrelated with this use. However, as referred to in connection with the different adaptations of the construction shown in Fig. 18, there are various other features, combinations and sub-combinations of the invention which are not so limited to the poultry industry, but are adaptable generally to other fields of conditioning work. I wish it also to be understood that, while the different forms disclosed are preferred, they are, nevertheless, purely exemplary in the sense that numerous modifications and rearrangements may be made therein without departing from the spirit and essence of the invention.

I claim:—

1. The combination with an enclosure, of an air conditioning device communicating therewith and establishing a circuit substantially closed to atmosphere for the circulation of air through said enclosure and said conditioning device, said device comprising a casing having substantially vertical partitions therein defining three substantially vertical passages, the first passage receiving the air from said enclosure, the second passage receiving the air from the lower end of said first passage, and the third passage receiving the air from the upper end of said second passage and returning the same to said enclosure, means for projecting spray into said first and second passages, means controlling said spray projection in accordance with the humidity of said air, baffle means disposed adjacent to the upper end of said second passage, heating means in said conditioning device beyond said baffle means, means disposed within said first passage responsive to the humidity of the air for controlling the temperature of the spray, and means responsive to the temperature of the air for controlling said heating means.

2. The combination with an enclosure of an air conditioning device communicating therewith and establishing a circuit substantially closed to atmosphere for the circulation of air through said enclosure and said conditioning device, said conditioning device comprising a casing having substantially vertical partitions dividing the interior thereof into a plurality of substantially vertical passages, the first passage receiving the air from said enclosure, the second passage receiving the air from the lower end of said first passage and the third passage receiving the air from the upper end of said second passage and returning the same to said enclosure, a spray water tank at the bottom of said first two passages, spray apparatus for projecting water into said first two passages above said tank, said spray apparatus drawing from said tank, baffles adjacent to the upper end of said second passage, means for heating the spray water, means responsive to the humidity of the air for controlling said heating means, means for heating the air, means responsive to the temperature of the air for controlling said latter air heating means, and a motor connected to operate said spray apparatus and said air circulating means.

3. The combination with an enclosure, of an air conditioning device communicating therewith, means for causing a continuous circulation of air through said enclosure and said conditioning device, means in said conditioning device for spraying a liquid into the air, means for cooling said spray liquid comprising a cooling tower outside of said conditioning device and through which said liquid is circulated, means for aerating said liquid without cooling to remove entrained gases and means responsive to the humidity of said air for selectively admitting liquid to said aerating means or to said cooling tower.

4. The combination with an enclosure, of an air conditioning device with means for propelling air therethrough and into the enclosure, means in said conditioning device for spraying a liquid into the air, means for cooling said spray liquid comprising a cooling tower outside of said conditioning device and through which said liquid is circulated, means for aerating said liquid to remove entrained gases without cooling it, means responsive to the humidity of said air for selectively admitting liquid to said aerating means or to said cooling tower, means for heating the air after it passes through said spray means, means responsive to the humidity of said air for selectively affecting the passage of liquid through said aerating means or said cooling tower, and means selectively effecting the passage of liquid through the cooling tower or for operating said air heating means responsive to the temperature of the air.

5. The combination with an enclosure, of an air conditioning device with means for propelling air therethrough and into the enclosure, means in said conditioning device for spraying liquid into the air passing therethrough, cooling means through which said spray liquid may be circulated in passing to said spray means, means for conducting the liquid to said spray means without passing through said cooling means so that its temperature will not be materially changed, means responsive to the humidity of the air for selectively admitting liquid through said cooling means or to the spray means without being cooled, means for heating the air after it passes through said spray means, and means for selectively effecting the passage of the liquid through said cooling means or effecting the operation of said air heating means responsive to the temperature of the air.

6. The combination with an enclosure of an air conditioning device communicating therewith and establishing a circuit substantially closed to atmosphere for the circulation of air through said enclosure and said conditioning device, means for causing a continuous circulation of air through said circuit, spray means in said conditioning device for spraying water into the air, means for cooling said spray water comprising an outside cooling tower in which the water is sprayed for dissipating its heat to the atmosphere, means responsive to the humidity of the circulated air for causing a circulation of the spray water through said cooling tower, and means responsive to the humidity and temperature of said air for selectively heating said spray water or for providing for additional cooling of said air after it leaves said spraying means.

7. The method of conditioning air in an enclosure which normally is substantially closed to outside atmosphere, which comprises circulating a volume of air in said enclosure, bringing the air into intimate contact with a liquid for absorbing carbon dioxid from the air, conducting such liquid through outside aerating means without a substantial change of heat for dissipating the carbon dioxid to the atmosphere, and returning said liquid and re-using it to again absorb carbon dioxid from the air.

8. The method of conditioning the air in an enclosure which comprises circulating a volume of air through a cycle closed to the atmosphere and including said enclosure, spraying water into said air for absorbing carbon dioxid therefrom, conducting the spray water to a point of aeration outside of said closed cycle for liberating the carbon dioxid to the atmosphere and for absorbing oxygen therefrom, controlling the superficial area of said spray in accordance with the humidity of said air, and returning said spray water to said closed cycle for transferring said oxygen to the circulating air therein.

9. The combination with an enclosure, of an air conditioning device communicating therewith and establishing a circuit substantially closed to atmosphere for the circulation of air through said enclosure and said conditioning device, means for causing a continuous circulation of air through said circuit, means in said conditioning device for spraying water into the air, a water circuit outside of said conditioning device, an aerating chamber in said circuit, insulating means permeable to gases for thermally insulating said aerating chamber from the atmosphere, a spray chamber normally open to the atmosphere and connected with said water circuit, a pump connected with said circuit to circulate the spray water through said aerating chamber and back into said conditioning device, means responsive to the humidity of the conditioned air for diverting some of the circulating water through said spray chamber, means for heating the circulating air, and means responsive to the temperature of the air for controlling said heating means.

10. The combination with an enclosure, of an air conditioning device communicating therewith and establishing a circuit for the circulation of air through said enclosure and said conditioning device, means for causing a continuous circulation of air through said circuit, spray means within said conditioning device, a spray water circuit extending outside said conditioning device, an aerator and a cooling tower connected with said spray water circuit, means for causing some of the spray water to flow through said outside circuit and to be returned to said conditioning device, means for heating the spray water, apparatus for sensing the humidity of the conditioned air, control means responding to a lowering of the humidity sensed by said apparatus for controlling the volume of spray projected as an initial corrective operation and for rendering operative the means for heating the spray water as a secondary corrective operation, control means responding to a rising humidity as sensed by said apparatus for causing some of the spray water in said outside spray water circuit to pass through said cooling tower as an initial corrective operation, and for controlling the volume of spray projected in said conditioning device as a secondary corrective operation, means for varying the temperature of the air circulating through said conditioning device, and temperature sensing apparatus responsive to the temperature of said air for controlling said temperature varying means.

11. The combination with an enclosure, of an air conditioning device communicating therewith and establishing a circuit for the circulation of air through said enclosure and said conditioning device, means for causing a continuous circulation of air through said circuit, said conditioning device comprising a spray chamber, spray projecting means therein, means for varying the superficial area of spray projected thereby in accordance with humidity sensings, baffles interposed in said air circuit, secondary spray means projecting a purifying liquid upon said baffles, a collecting receptacle associated with said baffles for receiving said purifying liquid, a closed circuit connecting said collecting receptacle with said secondary spray means, and purifying means acting on the purifying liquid flowing through said latter circuit.

12. The combination with an enclosure, of an air conditioning device communicating therewith and establishing a circuit for the circulation of air through said enclosure and said conditioning device, means for causing a circulation of air through said circuit, spray means in said conditioning device, aerating apparatus disposed outside of said conditioning device, means for causing the spray water to flow through said aerating apparatus, mixing apparatus for mixing a soluble or semi-soluble chemical with the spray water for reducing the vapor pressure thereof, and means responsive to the humidity of the air circulating through said enclosure for governing the addition to the spray water of the vapor pressure reducing chemical in said mixing apparatus and for governing the cooling of the spray water supplied through said aerating apparatus.

13. The combination with an enclosure, of an air conditioning device communicating therewith and establishing a circuit substantially closed to atmosphere for the circulation of air through said enclosure and said conditioning device, means for causing a continuous circulation of air through said circuit, spray means in said conditioning device, a spray water tank in said device receiving the water from said spray means, a heat insulated chamber disposed outside of said conditioning device for aerating the spray water substantially without loss of heat, and means for circulating the spray water from said tank to said outside chamber and thence back to said spray means.

14. The combination with an enclosure, of an air conditioning device communicating therewith and establishing a circuit substantially closed to atmosphere for the circulation of air through said enclosure and said conditioning device, means associated with said conditioning device for governing the humidity of the circulated air, means associated with said conditioning device for governing the temperature of the circulated air, means comprising booster means for admitting sufficient additional air to maintain in the enclosure a higher pressure than that of the outside atmosphere, and controlling means responsive to the pressure in the enclosure for controlling said latter means.

15. The combination with an enclosure, of an air conditioning device communicating therewith and establishing a circuit substantially closed to atmosphere for the continuous circulation of air through said enclosure and said conditioning device, comprising a casing having vertical partitions therein defining three passages in progressive communication, means for admitting air from said enclosure to the first of said passages, spray means in said first two passages, means for controlling the temperature of the liquid projected by said spray means, baffles disposed between said second and third passages, means posterior to said baffles for controlling the temperature of said air, separate independent means for admitting additional air under pressure to said circuit to maintain a pressure in said circuit higher than atmospheric pressure, and pressure differential means controlling said air admission means.

16. The combination with an enclosure, of an air conditioning device communicating therewith and establishing a circuit substantially closed to atmosphere for the continuous circulation of air through said enclosure and said conditioning device, comprising a casing having vertical partitions therein defining three passages in progressive communication, means for admitting air from said enclosure to the first of said passages, means for projecting a liquid spray into said first two passages, means for controlling the superficial area of the spray projected, means for controlling the temperature of the liquid spray, humidity responsive means governing the operation of both of said controlling means for maintaining a predetermined humidity in said air, baffles disposed between said second and third passages, means posterior to said baffles for controlling the temperature of said air, separate independent means for admitting additional air under pressure to said circuit to maintain a pressure in said circuit higher than atmospheric pressure, and pressure differential means controlling said air admission means.

17. The combination with an enclosure, of an air conditioning device communicating therewith and establishing a circuit substantially closed to atmosphere for the continuous circulation of air through said enclosure and said conditioning device, comprising a casing having partitions therein defining three passages in progressive communication, means for admitting air from said enclosure to the first of said passages, means for projecting a liquid spray into said first two passages, means for controlling the superficial area of the spray projected, means for controlling the temperature of the liquid spray, humidity responsive means governing the operation of both of said controlling means for maintaining a predetermined humidity in said air, means responsive to the temperature of the air entering said device and cooperating with said humidity responsive means for governing said temperature controlling means, separate independent means for admitting additional air under pressure to said circuit to maintain a pressure in said circuit higher than atmospheric pressure, and pressure differential means controlling said air admission means.

18. The combination with an enclosure, of an air conditioning device communicating therewith and establishing a circuit substantially closed to atmosphere for the continuous circulation of air through said enclosure and said conditioning device, comprising a casing having partitions therein defining three passages in progressive communication, means for admitting air from said enclosure to the first of said passages, means for projecting a liquid spray into said first two passages, a tank for collecting said discharged spray, a cooling tower, an aerating chamber, conduit means connecting said tank with said tower and said chamber, humidity responsive means providing for selective admission of said liquid to said tower and to said chamber, pump means for circulating said liquid, means governed by said humidity responsive means for heating the liquid in said collecting tank, and separate independent means for admitting additional air under pressure to said circuit to maintain a pressure in said circuit higher than atmospheric pressure, and pressure differential means controlling said air admission means.

19. The method of conditioning air for an enclosure which normally is substantially closed to outside atmosphere, which comprises circulating a volume of air in said enclosure, conducting said air through a conditioning unit, spraying the air with a liquid for absorbing carbon dioxide from the air, collecting the sprayed liquid, circulating said liquid through a chamber without an appreciable variation of temperature while passing through the chamber, aerating said liquid in said chamber to remove said absorbed carbon dioxide without a substantial change of heat, adding a soluble or colloidal chemical absorbent to a portion of said liquid, returning said liquid for respraying said air, and governing the quantity of said spray liquid admitted to said aerating chamber in accordance with the humidity of said air.

20. The method of conditioning air for an enclosure which normally is closed to outside atmosphere, which comprises circulating a volume of air in said enclosure, conducting said air through a closed conditioning unit, spraying said air with a liquid for humidifying said air and absorbing carbon dioxide therefrom, collecting said sprayed liquid, circulating said liquid through a chamber without appreciable variation of temperature while passing through said chamber, aerating said liquid in said chamber to remove said carbon dioxide without loss of heat, circulating said liquid through a second chamber, and simultaneously cooling the same, selectively controlling the circulation of said liquid to said chambers in accordance with humidity conditions, adding a soluble or colloidal chemical absorbent to a portion of said liquid, and governing the quantity of absorbent added to said liquid in accordance with the humidity of said air.

21. In combination with an enclosure substantially closed to outside atmosphere, a conditioning device in closed circuit connection with said enclosure for establishing circulation of conditioned air through said enclosure, spray means in said conditioning device, thermally insulated aerating apparatus outside said device, means for causing spray water to flow through said aerating apparatus, mixing apparatus for mixing a soluble or colloidal chemical with the spray water for reducing the vapor pressure thereof, a cooling tower adapted to receive said spray water, means for selectively admitting said spray water to said aerating apparatus or said cooling tower in response to the humidity of said air, and means for governing the admission of said reducing chemical in accordance with the humidity of said air.

22. In combination with an enclosure substantially closed to outside atmosphere, a conditioning device in closed circuit connected with said enclosure for establishing circulation of conditioned air through said enclosure, spray means in said conditioning device, thermally insulated aerating apparatus outside said device, means for causing spray water to flow through said aerating apparatus, mixing apparatus for mixing a soluble or colloidal chemical with the spray water for reducing the vapor pressure thereof, a cooling tower adapted to receive said spray water, means for heating said spray water, and means for governing the humidity of said air comprising humidity responsive means for admitting said chemical to said spray water as a first corrective step to decrease the humidity of said air, said means providing for circulation of said spray water through said cooling tower to further decrease the humidity of said air, and providing for actuating said heating means to increase said humidity, said means automatically limiting the concentration of said chemical in said spray water when said cooling tower is in operation.

23. The method of conditioning air, which comprises propelling the air to be conditioned through a conditioning chamber, and conditioning the air by projecting a spray liquid into the air, governing the humidity of the air by mixing a chemical for reducing the vapor pressure of the sprayed liquid with the liquid, controlling the admission of said chemical and the superficial area of said spray in accordance with the humidity to be maintained in said air, further controlling the humidity of said air by passing said air over a dry adsorbent to reduce the vapor pressure of said air, and passing said air over extended cooling surfaces maintained at a temperature above the dew point temperature of said air in accordance with the reduction of vapor pressure effected by said dry adsorbent.

24. The method of conditioning air, which comprises spraying said air with a liquid and a soluble or colloidal chemical absorbent, maintaining said absorbent cool, removing absorbed gases from said spray liquid, controlling said cooling and removing operations in accordance with predetermined humidity conditions, raising the relative humidity of said air, and controlling the temperature of said air in accordance with the temperature of the air prior to its dehumidification.

25. The method of conditioning air, which comprises projecting a spray of water into the air, recirculating the spray water for reprojecting a spray into the air, mixing a soluble or colloidal chemical absorbent in the spray water, governing the concentration of said chemical absorbent in said spray water in accordance with the humidity of said air, maintaining said spray water cool, and governing the temperature of said sprayed air to impart desired conditions of temperature and humidity thereto.

26. The method of conditioning air, which comprises projecting a spray of water into the air, recirculating the spray water to again project a spray into the air, mixing a chemical absorbent with the water to reduce the aqueous vapor pressure of the spray water, dehumidifying said air, governing the dehumidification of the air by controlling the concentration of said chemical absorbent in the water in accordance with the humidity of the sprayed air, cooling said spray water to carry on said dehumidification operation isothermally, and raising the relative humidity of said air to the desired degree to attain the desired temperature in said conditioned air.

27. In an air conditioning system, the method of simultaneously reducing the total heat and the moisture content of air which comprises passing said air into intimate contact with an aqueous solution, reducing the vapor pressure of the solution by adding a salt thereto, cooling said solution, controlling the addition of the salt in accordance with the humidity of the air, removing entrained particles of said solution from the air, and discharging said air into said system.

28. In an air conditioning system including a conditioning unit having baffles therein, the method of simultaneously reducing the dry bulb temperature and dewpoint temperature of air which comprises passing said air into a conditioning unit, intimately contacting said air wth an aqueous solution containing a hygroscopic salt, controlling the concentration of said solution in accordance with the humidity of air entering said unit, removing the heat of condensation of the absorbed moisture independently of the dehydrated air, wetting the baffles in the conditioning unit, and discharging said air through said wet baffles.

29. An air conditioning system for an enclosure including means for introducing a stream of fresh air into the enclosure, pressure responsive means operable by the pressure differences within and without the enclosure for controlling the fresh air introducing means to maintain a substantially constant differential pressure within the enclosure above the pressure outside thereof to produce an exfiltration of air therefrom, means associated with the enclosure to produce a second stream of air to circulate therein and commingle with said first stream of fresh air, means for conditioning one of said streams of air to impart the desired humidity thereto, means for supplying tempering means to the other stream of air, and humidity and temperature responsive devices in the enclosure for controlling said humidity conditioning means and tempering means respectively, whereby the required ventilation, humidity and temperature are maintained in the enclosure.

30. An air conditioning system for an enclosure including means for introducing a stream of fresh air into the enclosure, pressure responsive means operable by the pressure differences within and without the enclosure for controlling the fresh air introducing means to maintain a substantially constant differential pressure within the enclosure above the pressure outside thereof to produce an exfiltration of air therefrom, means associated with the enclosure to produce a second stream of air to circulate therein and commingle with said first stream of fresh air, means for conditioning one of said streams of air to impart the desired humidity thereto, a humidity responsive device in the enclosure for controlling said conditioning means, means for supplying heating or cooling mediums to the other stream of air, and a temperature responsive device in the enclosure for controlling the supply of the heating or cooling medium thereto, whereby the required ventilation, humidity and temperature are maintained in the enclosure.

31. An air conditioning system for an enclosure including means for introducing a stream of fresh air into the enclosure, pressure responsive means operable by the pressure differences within and without the enclosure for controlling the fresh air introducing means to maintain a substantially constant differential pressure within the enclosure above the pressure outside thereof to produce an exfiltration of air therefrom, means associated with the enclosure to produce a second stream of air to circulate therein and commingle with said first stream of fresh air, means for conditioning one of said streams of air to impart the desired humidity thereto, means associated with said humidity conditioning means for controlling the volume of the stream of air with which the humidity conditioning means is associated, a humidity responsive device in the enclosure for controlling said conditioning means and the volume of the air stream associated therewith by said volume control means, means for supplying heating or cooling mediums to the other stream of air, and a temperature responsive device in the enclosure for controlling the supply of the heating or cooling medium thereto, whereby the required ventilation, humidity and temperature are maintained in the enclosure.

32. The combination with an enclosure to be conditioned, of a conditioning chamber having substantially closed circuit communication with said enclosure for drawing air from said enclosure, passing it through said chamber, and returning it to said enclosure, means for creating such circulation of air through said chamber, means in said chamber for conditioning the air passing therethough, a second conditioning chamber drawing air from the atmosphere and discharging into said enclosure, means in said second chamber for conditioning the air passing therethrough, and means responsive to one of the conditions in said enclosure for controlling the circulation of air through said first mentioned conditioning chamber.

33. The method of conditioning an enclosure which comprises taking outside air of a temperature lower than the temperature within the enclosure, passing it through a conditioning device and forcing it into the enclosure only in a volume sufficient to maintain a pressure in the enclosure so as to minimize infiltration of atmosphere into said enclosure at leakage points, substantially saturating the air thus forced into the enclosure in its passage through said conditioning device, taking the air within the enclosure and passing it through another conditioning device and directly back into the enclosure, and substantially saturating such air in its passage through said latter conditioning device for lowering the temperature by adiabatic cooling resulting from the water evaporation in the operation of raising the dew point of the air passing through said second conditioning device.

34. The method of conditioning an enclosure which comprises taking outside air, passing it through a conditioning device and forcing it into the enclosure in a volume sufficient to maintain a pressure in the enclosure so as to prevent infiltration of atmosphere into said enclosure at other points, taking the air within the enclosure and passing it through a second conditioning device and directly back into the enclosure, controlling the humidity within the enclosure by substantially saturating the air within said second conditioning device to correct a falling humidity and by cooling the air entering through said first conditioning device to correct a rising humidity, and controlling the temperature within the enclosure by cooling the air entering through said first conditioning device to correct a rising temperature and by heating the air passing through one of said conditioning devices to correct a falling temperature.

35. The method of conditioning an enclosure requiring a relatively high humidity, which comprises taking air from an outside source, passing it through a conditioning device and forcing it into the enclosure in a volume sufficient to maintain a pressure in the enclosure so as to minimize infiltration of atmosphere into said enclosure at other points, conditioning such air in its passage through said conditioning device to have a dry bulb temperature below the dew point required in the enclosure, taking the air within the enclosure and passing it through another conditioning device and back into the enclosure, saturating such air in its passage through said latter conditioning device, controlling the temperature in the enclosure by controlling the cooling of the air entering through said first conditioning device, and controlling the humidity in the enclosure by controlling the flow of air through said second conditioning device.

36. In air conditioning apparatus of the class described, the combination of spray means for spraying a liquid into the air, means responsive to the humidity of the air for controlling said spray means to vary the superficial area of spray projected, adsorbent material through which the air is caused to pass to dehumidify said air without a substantial change in its total heat, cooling means for cooling the air after passing through said adsorbent material, and means responsive to the temperature of the air for controlling said cooling means.

37. The combination with an enclosure to be conditioned, of a conditioning chamber having substantially closed circuit communication with said enclosure for drawing air from said enclosure, passing it through said chamber, and returning it to said enclosure, means for creating such circulation of air through said chamber, means in said chamber for conditioning the air passing therethrough, a second conditioning chamber drawing air from the atmosphere and discharging into said enclosure, means in said second chamber for conditioning the air passing therethrough, and means responsive to one of the conditions in said enclosure for controlling the circulation of air through one conditioning chamber.

38. The combination with an enclosure, of an air conditioning device communicating therewith and establishing a circuit substantially closed to atmosphere for the circulation of air through said enclosure and said conditioning device, means for causing a continuous circulation of air through said circuit, spray means in said conditioning device, a spray water tank in said device receiving the water from said spray means, a heat insulated chamber disposed outside of said conditioning device for aerating the spray water substantially without loss of heat, means for circulating the spray water from said tank to said outside chamber and thence back to said spray means, and means for exchanging heat between incoming and outgoing air.

39. In an air conditioning system in combination fine and coarse sprays, means for projecting liquid from a single source through said fine and coarse sprays, and means for automatically controlling the projecting liquid through the coarse sprays while the liquid is discharged through the fine sprays whereby the pressure through the fine sprays will be reduced when the liquid is flowing through both sets of sprays.

40. In an air conditioning system in combination fine sprays and coarse sprays, means for projecting liquid from a single source through said sprays, means for automatically controlling the projection of liquid through one of said sprays whereby when both sprays are operating the liquid therein will be projected at a reduced pressure and thereby coarser than when only one of the spraying means is operating.

41. The method of conditioning air comprising moving the air through a passageway, projecting liquid into the air in a fine spray, selectively projecting liquid into the air in a coarse spray, and varying the pressure of liquid through the fine spray by the operation of the coarse spray, and automatic means controlling the operation of the coarse spray.

42. The method of conditioning air comprising moving air through a passageway projecting liquid into the air in a fine spray, selectively projecting liquid into the air in a coarse spray, supplying the liquid for both sprays from a single body of liquid to cause division of the body of liquid when the liquid is being projected in both fine and coarse sprays, and automatically controlling the operation for the coarse sprays to vary the pressure of the liquid projected through the fine spray.

43. The combination with an enclosure to be conditioned, of a conditioning chamber having substantially closed circuit communication with said enclosure for drawing air from said enclosure, passing it through said chamber, and returning it to said enclosure, means for creating such circulation of air through said chamber, means in said chamber for conditioning the air passing therethrough, a second conditioning chamber drawing air from the atmosphere and discharging into said enclosure, means in said second chamber for conditioning the air passing therethrough, and means responsive to humidity in said enclosure for controlling the circulation of air through one conditioning chamber.

44. The combination with an enclosure to be conditioned, of a conditioning chamber having substantially closed circuit communication with said enclosure for drawing air from said enclosure, passing it through said chamber, and returning it to said enclosure, means for creating such circulation of air through said chamber, means in said chamber for conditioning the air passing therethrough, a second conditioning chamber drawing air from the atmosphere and discharging into said closure, means in said second chamber for modifying the humidity of the air passing therethrough, and means responsive to one of the conditions in said enclosure for controlling the circulation of air through one conditioning chamber.

45. The combination with an enclosure to be conditioned, of a conditioning chamber having substantially closed circuit communication with said enclosure for drawing air from said enclosure, passing it through said chamber, and returning it to said enclosure, means for creating such circulation of air through said chamber, a cooling element in said chamber for cooling the air passing therethrough, refrigerating means for supplying cooling fluid to said element, a second conditioning chamber drawing air from the atmosphere and discharging it into said enclosure, means in said second chamber for conditioning the air passing therethrough, and means responsive to one of the conditions in said enclosure for controlling the circulation of air through said first mentioned conditioning chamber.

ROBERT B. P. CRAWFORD.